US010816366B2

(12) United States Patent
Weiland et al.

(10) Patent No.: US 10,816,366 B2
(45) Date of Patent: Oct. 27, 2020

(54) MAGNETIC FIELD SENSOR FOR DETECTING AN ABSOLUTE POSITION OF A TARGET OBJECT

(71) Applicant: Allegro MicroSystems, LLC, Manchester, NH (US)

(72) Inventors: Dominik Weiland, Sandhausen (DE); Nathan Shewmon, Heidelberg (DE); Syed Bilal Ali, Heidelberg (DE)

(73) Assignee: Allegro MicroSystems, LLC, Manchester, NH (US)

( * ) Notice: Subject to any disclaimer, the term of this patent is extended or adjusted under 35 U.S.C. 154(b) by 27 days.

(21) Appl. No.: 16/254,869

(22) Filed: Jan. 23, 2019

(65) Prior Publication Data

US 2020/0232822 A1 Jul. 23, 2020

(51) Int. Cl.
*G01D 5/245* (2006.01)
*G01P 13/04* (2006.01)
(52) U.S. Cl.
CPC ............ *G01D 5/245* (2013.01); *G01P 13/045* (2013.01)
(58) Field of Classification Search
None
See application file for complete search history.

(56) References Cited

U.S. PATENT DOCUMENTS

| 4,556,886 | A |   | 12/1985 | Shimizu et al. |
| 5,905,350 | A | * | 5/1999 | Hofbauer ............ G01D 5/24409 318/400.28 |
| 6,525,531 | B2 |   | 2/2003 | Forrest et al. |
| 6,556,153 | B1 | * | 4/2003 | Cardamone ........ G01D 5/24404 341/111 |
| 7,362,094 | B2 |   | 4/2008 | Voisine et al. |
| 2005/0122242 | A1 |   | 6/2005 | Inenaga et al. |
| 2007/0145970 | A1 |   | 6/2007 | Takahashi |
| 2008/0061771 | A1 | * | 3/2008 | Sugiyama ............ G01D 5/2451 324/207.25 |

(Continued)

FOREIGN PATENT DOCUMENTS

DE 10 2017 221 883 A1 6/2019

OTHER PUBLICATIONS

Allegro "Precision Hail-Effect Angle Sensor IC" Datasheet No. A1334; A1334A-DS, Rev. 9 MCO-0000465 dated Nov. 2, 2018, 19 pages.

(Continued)

*Primary Examiner* — Jas A Sanghera
(74) *Attorney, Agent, or Firm* — Daly, Crowley, Mofford & Durkee, LLP

(57) ABSTRACT

A magnetic field sensor for sensing an absolute position of a target object can include one or more magnetic field sensing elements disposed proximate to a mechanical intersection of first and second portions of a target object, wherein the one or more magnetic field sensing elements are operable to generate a first magnetic field signal responsive to the movement of both the first and second portions. The magnetic field sensor can also include a position detection module operable to use the first magnetic field signal to generate a position value indicative of the absolute position. The magnetic field sensor can also include an output format module coupled to receive the position value and to generate an output signal from the magnetic field sensor indicative of the absolute position.

29 Claims, 22 Drawing Sheets

(56) References Cited

U.S. PATENT DOCUMENTS

| | | | |
|---|---|---|---|
| 2009/0315544 A1* | 12/2009 | Takahashi | G01P 13/04 |
| | | | 324/207.25 |
| 2011/0309824 A1* | 12/2011 | Takahashi | F16C 41/007 |
| | | | 324/207.13 |
| 2013/0277782 A1 | 10/2013 | Doogue et al. | |
| 2015/0253153 A1 | 9/2015 | Smithanik et al. | |
| 2016/0363638 A1 | 12/2016 | Daubert | |
| 2017/0045380 A1* | 2/2017 | Ueda | G01D 5/2451 |
| 2019/0310111 A1 | 10/2019 | Werth et al. | |

OTHER PUBLICATIONS

U.S. Appl. No. 16/254,874, filed Jan. 23, 2019, Weiland et al.
U.S. Non-Final Office Action dated Apr. 28, 2020 for U.S. Appl. No. 16/254,874; 33 pages.
Response to Office Action filed on Jul. 24, 2020 for U.S. Appl. No. 16/254,874; 22 pages.
Final Office Action dated Sep. 1, 2020 for U.S. Appl. No. 16/254,874; 5 pages.

* cited by examiner

MAGNETIC FIELD SENSOR FOR DETECTING AN ABSOLUTE POSITION OF A TARGET OBJECT

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to magnetic field sensors, and, more particularly, to a magnetic field sensor that can detect an absolute position (e.g., a rotation absolute angle) of a target object.

BACKGROUND

Various types of magnetic field sensing elements are known, including Hall Effect elements and magnetoresistance elements. In contrast, magnetic field sensors generally include a magnetic field sensing element and other electronic components. Some magnetic field sensors also include a permanent magnet (a hard ferromagnetic object) in a so-called "back biased" arrangement described more fully below. With a back-biased arrangement, a moving ferromagnetic object can cause fluctuations in the magnetic field of the magnet, which is sensed by the back biased magnetic field sensor. Other magnetic field sensors can sense motion of a magnetic target object.

Magnetic field sensors provide an electrical signal representative of a sensed magnetic field. In some embodiments that have the magnet (back-biased arrangements), the sensed magnetic field is a magnetic field generated by the magnet, in which case, in the presence of a moving ferromagnetic object, the magnetic field generated by the magnet and sensed by the magnetic field sensor varies in accordance with a shape or profile of the moving ferromagnetic object. In contrast, magnetic field sensors that sense a moving magnet directly sense variations of magnetic field magnitude and direction that result from movement of the magnet.

Magnetic field sensors (back-biased) are often used to detect movement of features of a ferromagnetic gear, such as gear teeth and/or gear slots or valleys. A magnetic field sensor in this application is commonly referred to as a "gear tooth" sensor.

In some arrangements, the ferromagnetic gear is placed upon an object, for example, a camshaft in an engine or the shaft of an electric motor. Thus, it is the rotation of the object (e.g., camshaft) that is sensed by detecting the moving features of the ferromagnetic gear. Gear tooth sensors are used, for example, in automotive applications to provide information to an engine control processor for ignition timing control, fuel management, anti-lock braking systems, wheel speed sensors, electric motor commutation and other operations.

With regard to electric motors, information provided by the gear-tooth sensor to an electric motor control processor can include, but is not limited to, an absolute angle of rotation of an object (e.g. a motor shaft) as it rotates, a speed of the rotation, and a direction of the rotation. With this information the e-motor control processor can adjust the timing of commutating different magnetic coils of the motor.

However, in some electric motor drive applications, the gear tooth sensor does not provide accurate enough determination of angle of rotation, i.e., position, and direction of rotation of the electric motor shaft. One such application is for main drive electric motors used in electrical automobiles.

In some electric motor drive applications, a plurality of magnetic field sensing elements, e.g., three Hall elements, are used in relation to a plurality of windings of a multi-phase electric motor, which has a plurality of motor windings, in order to sense a position of the electric motor shaft. With this arrangement, an electric motor control processor can use signals from the plurality of magnetic field sensing elements to generate a plurality signals with proper phases communicated to the plurality of motor windings. However, in some electric motor drive applications, the plurality of magnetic field sensing elements also does not provide accurate enough determination of angle of rotation, i.e., position, and direction of rotation of the electric motor shaft.

Applications for which more accuracy is desired include, but are not limited to, main drive electric motors used in electrical automobiles.

Thus, it would be desirable to provide a magnetic field sensor that can identify, with improved accuracy, a rotational angle, i.e., a position, or a linear position of a target object as the target object moves. The target object can be coupled to, but is not limited to being coupled to, a shaft of an electric motor.

SUMMARY

The present invention provides a magnetic field sensor that can identify, with improved accuracy, a rotational angle, i.e., a position, or a linear position of a target object as the target object moves. The target object can be coupled to, but is not limited to being coupled to, a shaft of an electric motor.

In accordance with an example useful for understanding an aspect of the present invention, a magnetic field sensor for sensing an absolute position of a target object, wherein the target object has a first portion having a first quantity of target features and a second portion having a second quantity of target features different than the first quantity, wherein the first and second portions are proximate and mechanically fixed together, wherein the target object, including the first and second portions, is capable of a movement, the magnetic field sensor can include:

one or more magnetic field sensing elements disposed proximate to a mechanical intersection of the first and second portions of the target object, wherein the one or more magnetic field sensing elements are operable to generate a first magnetic field signal responsive to the movement of both the first and second portions;

a position detection module operable to use the first magnetic field signal to generate a position value indicative of the absolute position; and an output format module coupled to receive the position value and to generate an output signal from the magnetic field sensor indicative of the absolute position.

In accordance with an example useful for understanding another aspect of the present invention, a method of sensing an absolute position of a target object, wherein the target object has a first portion having a first quantity of target features and a second portion having a second quantity of target features different than the first quantity, wherein the first and second portions are proximate and mechanically fixed together, wherein the target object, including the first and second portions, is capable of a movement, the method can include:

generating a first magnetic field signal responsive to the movement of both the first and second portions;

using the first magnetic field signal to generate a position value indicative of the absolute position; and generating an output signal from the magnetic field sensor indicative of the absolute position.

In accordance with an example useful for understanding another aspect of the present invention, a magnetic field sensor for sensing an absolute position of a target object, wherein the target object has a first portion having a first quantity of target features and a second portion having a second quantity of target features different than the first quantity, wherein the first and second portions are proximate and mechanically fixed together, wherein the target object, including the first and second portions, is capable of a movement, the magnetic field sensor can include:

means for generating a first magnetic field signal responsive to the movement of both the first and second portions;

means for using the first magnetic field signal to generate a position value indicative of the absolute position; and means for generating an output signal from the magnetic field sensor indicative of the absolute position.

BRIEF DESCRIPTION OF THE DRAWINGS

The foregoing features of the invention, as well as the invention itself may be more fully understood from the following detailed description of the drawings, in which.

DETAILED DESCRIPTION

Figure 2:
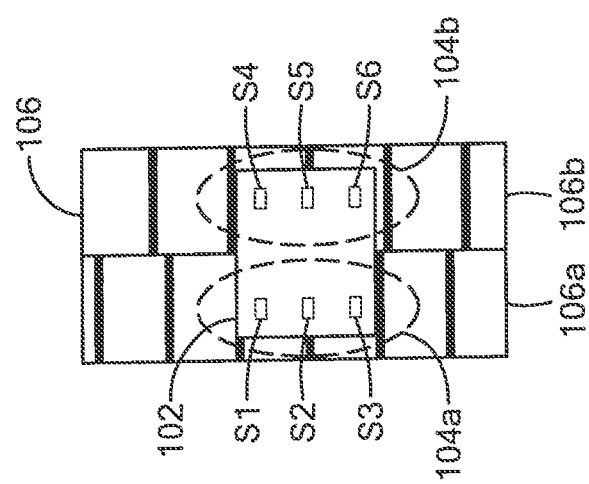
FIG. 2 is a pictorial diagram showing a top view of the magnetic field sensor and target object of FIG. 1.

Before describing the present invention, it should be noted that reference is sometimes made herein to target objects having a particular shape (e.g., round). One of ordinary skill in the art will appreciate, however, that the techniques described herein are applicable to a variety of sizes and shapes, including a flat target object.

Before describing the present invention, some introductory concepts and terminology are explained.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

The terms "parallel" and "perpendicular" are used in various contexts herein. It should be understood that the terms parallel and perpendicular do not require exact perpendicularity or exact parallelism, but instead it is intended that normal manufacturing tolerances apply, which tolerances depend upon the context in which the terms are used. In some instances, the term "substantially" is used to modify the terms "parallel" or "perpendicular." In general, use of the term "substantially" reflects angles that are beyond manufacturing tolerances, for example, within +/−ten degrees.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be analog or digital, and which may or may not have an arithmetic logic unit (ALU).

As used herein, the term "module" can be used to describe a "processor." However, the term "module" is used more generally to describe any circuit that can transform an input signal into an output signal that is different than the input signal.

A processor can contain internal processors or internal modules that perform portions of the function, operation, or sequence of operations of the processor. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures, but should be understood.

In particular, it should be understood that a so-called comparator can be comprised of an analog comparator having a two state output signal indicative of an input signal being above or below a threshold level (or indicative of one input signal being above or below another input signal). However, the comparator can also be comprised of a digital circuit having an output signal with at least two states indicative of an input signal being above or below a threshold level (or indicative of one input signal being above or below another input signal), respectively, or a digital value above or below a digital threshold value (or another digital value), respectively.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

As used herein, the term "amplifier" is used to describe a circuit element with a gain greater than one, less than one, or equal to one.

As used herein, the terms "line" and "linear" are used to describe either a straight line or a curved line. The line can be described by a function having any order less than infinite.

While planar Hall effect elements are shown in some figures herein, in other embodiments, any type of magnetic field sensing elements can be used.

The terms "absolute position" and "absolute angle" are used to refer to a position or an angle of a target object relative of a reference position determined by a position of a magnetic field sensor.

Figure 1:
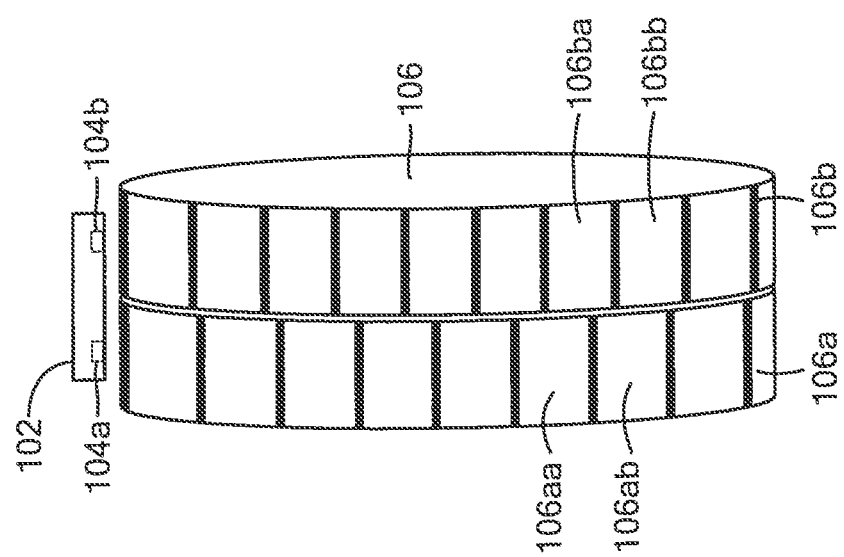
FIG. 1 is an isometric drawing showing a side view of a magnetic field sensor proximate to a target object, the target object having first and second portions, wherein the first and second portions have different numbers of target features, and wherein the magnetic field sensor has first one or more magnetic field sensing elements disposed proximate to the first portion and second one or more magnetic field sensing elements disposed proximate to the second portion.

Referring to FIG. 1, a magnetic field sensor 102 can sense an absolute position (i.e., absolute rotation angle) of a target object 106. The target object 106 has a first portion 106a having a first quantity of target features, e.g., target features 106aa, 106ab, and a second portion 106b having a second quantity of target features, e.g., target features 106ba, 106bb, different than the first quantity. The first and second portions 106a, 106b can be mechanically fixed together. The target object 106, including the first and second portions 106a, 106b, is capable of a movement relative to the magnetic field sensor 102. The magnetic field sensor 102 can include a first one or more magnetic field sensing elements 104a disposed proximate to the first portion 106a. The first one or more magnetic field sensing elements 104a can be operable to generate a first magnetic field signal responsive to the movement (e.g., rotation) of the first portion 106a. The magnetic field sensor 102 can also include a second one or more magnetic field sensing elements 104b disposed proximate to the second portion 106b. The second one or more magnetic field sensing elements 104b can be operable to generate a second magnetic field signal responsive to the movement of the second portion 106b. The magnetic field sensor 102 can also include a position detection module coupled to use the first and second magnetic field signals to generate a position value indicative of the absolute position, and an output format module coupled to receive the position value and to generate an output signal from the magnetic field sensor indicative of the absolute position. The position detection module and the output format module are described in conjunction with figures below.

Examples described herein use target objects for which the quantities of features on the first and second portions of the target object differ by one feature. However, in other embodiments, the difference can be greater, for example, one, two, three, four, five, or more than five features.

Embodiments described herein use target objects having first and second target object portions that rotate or move in the same direction.

In some embodiments, some of the target features, e.g., 106aa, 106ba, are teeth of a respective ferromagnetic gear portion and other target features, e.g., 106ab, 106bb, are valleys. These embodiments can include a permanent magnet (see, e.g., FIG. 10) disposed within or proximate to the magnetic field sensor 102 in a so-called "back-biased" arrangement. In a back-biased arrangement, the magnetic field sensor 102 experiences changes of magnetic field generated by the permanent magnet as the gear teeth and valleys pass by the magnetic field sensor 102.

In other embodiments, some of the target features, e.g., 106aa, 106ba are north magnetic poles of a respective ring magnet portion and other target features, e.g., 106ab, 106bb, are south magnetic poles. These embodiments have no back-biased magnet.

Referring now to FIG. 2, in which like element so FIG. 1 are shown having like reference designations, the magnetic field sensor 102 is again shown proximate to the target object 106. Here, the first one or more magnetic field sensing elements 104a can include three magnetic field sensing elements S1, S2, S3, and the second one or more magnetic field sensing elements 104b can include three magnetic field sensing elements S4, S5, S6.

Electronic circuits that use the first one or more magnetic field sensing elements 104a and the second one or more magnetic field sensing elements 104b are shown in figures below.

Figure 3:
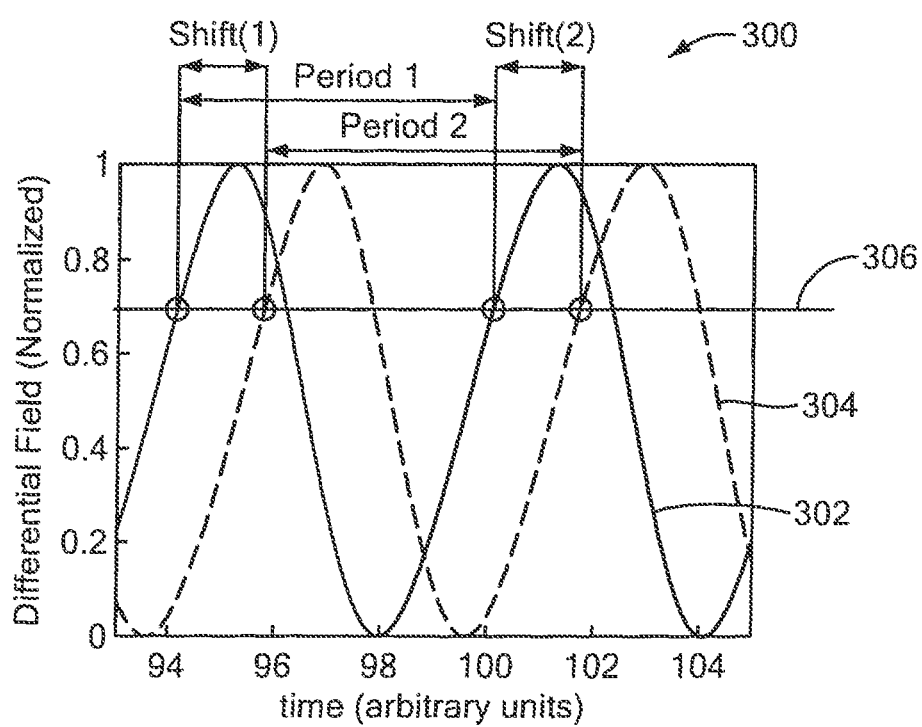
FIG. 3 is a graph showing illustrative signals generated by the first and second one or more magnetic field sensing elements of FIG. 1, and also thresholds that can be used to detect angular position of the target object when the target object rotates.

Referring now to FIG. 3, a graph 300 has a horizontal axis with a scale in units of time in arbitrary units and a vertical axis with a scale in units of differential magnetic field in arbitrary units. In some embodiments, the differential field can be identified by a difference of signals from the magnetic field sensing elements S1, S2, S3 of FIG. 2 and a difference of signals from the magnetic field sensing elements S4, S4, S6 of FIG. 2. In other embodiments described below, differential arrangements are not used and the magnetic field sensor can use only two of the magnetic field sensing elements S1, S2, or S3 and S4, S5, or S6, taken individually.

A signal 302 is indicative of the difference of signals from the magnetic field sensing elements S1, S2, S3 of FIG. 2 and a signal 304 is indicative of the difference of signals from the magnetic field sensing elements S4, S5, S6 of FIG. 2 as the target object 106 spins or rotates. For example, referring briefly to FIGS. 1 and 2, signal 302 can be indicative of a difference S1-S2 and signal 304 can be indicative of a difference S4-S5. However, other differences are possible.

Since the magnetic field sensing elements S1, S2, S3 are proximate to the first portion 106a of the target object 106 and the magnetic field sensing elements S4, S5, S6 are proximate to the second portion 106b of the target object 106, the signals 302, 304 can have a phase difference that changes with rotation of the target object.

The phase difference of the signals 302, 304 can be determined in a variety of ways. In some embodiments, the phase difference can be determined using a threshold value 306 and comparing the first and second signal 302, 304 to the threshold value 306. Differences of times when the first signal 302 and the second signal 304 cross the threshold value 306 are identified as a shift(1) and a shift(2), each of which, in time (e.g., as a percentage of a period of one of the signals 302, 304), is indicative of a phase difference between the first and second signals 302, 304, wherein the phase difference changes with cycle of the first and second signals 302, 304. Period1 and Period2 are different periods.

The above arrangement is described more fully below in conjunction with FIGS. 4 and 5. Other arrangements that can identify the phase difference between the first and second signals 302, 304 are described below in conjunction with FIGS. 6 and 7.

Figure 4:
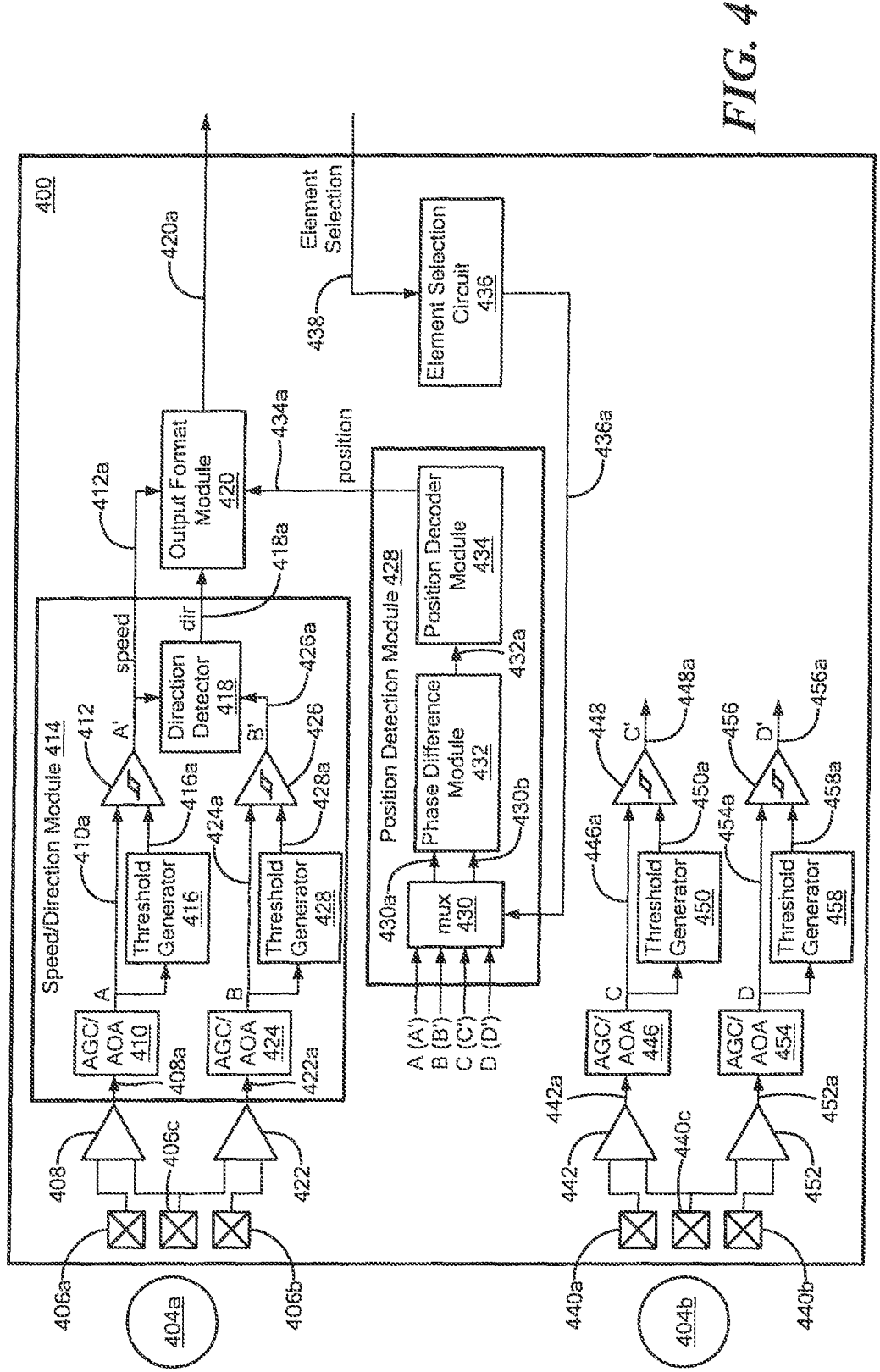
FIG. 4 is a block diagram showing an illustrative magnetic field sensor proximate to two target object portions, here shown to be separate, that can be like the magnetic field sensor and two portions of FIGS. 1 and 2, which can generate the signals of FIG. 3, and which can have a phase difference module operable to identify a phase difference between the signals of FIG. 3.

Referring now to FIG. 4, an illustrative magnetic field sensor 400 can be disposed proximate to a first portion 404a of a target object and a second portion 404b of a target object. The first and second portions 404a, 404b of the target object can be the same as or similar to the first and second portions 106a, 106b of the target object 106 of FIGS. 1 and 2. While the first and second portions 404a, 404b shown to be separate, it should be understood that the first and second portions 404a, 404b are shown as being mechanically separate merely for clarity in reference to the magnetic field sensor 400.

The magnetic field sensor 400 can include a first one or more magnetic field sensing elements 406a, 406b, 406c disposed proximate to the first portion 404a of the target object. The magnetic field sensor 400 can also include a second one or more magnetic field sensing elements 440a, 440b, 440c disposed proximate to the second portion 404b of the target object. The first one or more magnetic field sensing elements 406a, 406b, 406c can be the same as or similar to the first one or more magnetic field sensing elements 104a of FIGS. 1 and 2. The second one or more magnetic field sensing elements 440a, 440b, 440c can be the same as or similar to the second one or more magnetic field sensing elements 104b of FIGS. 1 and 2.

Magnetic field sensing elements 406a, 406c can be coupled in a differential arrangement to input nodes of an amplifier 408 to generate an amplified signal 408a.

An automatic gain control and automatic offset control circuit 410 can be coupled to the amplified signal 408a and can generate a controlled signal 410a, also indicated with a designation A.

A threshold generator circuit 416 can be coupled to the controlled signal 410a and can generate a threshold signal 416a.

The controlled signal 410a and the threshold signal 416a can be coupled to input nodes of comparator 412 to generate a comparison signal 412a, also indicated with a designation A'. In some embodiments, the comparison signal 412a is a two state signal with high states and low states. The comparison signal 412a can also be referred to as a speed signal for which a rate of transitions is indicative of a speed of rotation of the first and second portions 404a, 404b of the target object.

Generation of threshold signals is briefly described above. Let it suffice here to say that the threshold generator 416 can be operable to identify one or more threshold values between a positive peak and a negative peak of the controlled signal 410a. For example, in some embodiments, the threshold generator 416 can sequentially identify a first threshold value that is about sixty percent of a range between the positive peak and the negative peak of the controlled signal 410a, and a second threshold value that is about forty percent of the range between the positive peak and the negative peak of the controlled signal 410a. Thus, the comparison signal 412a can have transitions of state when the controlled signal 410a crosses upward past the first threshold value and crosses downward past the second threshold value, back and forth.

Magnetic field sensing elements 406b, 406c can be coupled in another differential arrangement to input nodes of an amplifier 422 to generate an amplified signal 422a.

The amplified signal 408a and the amplified signal 422a can both have characteristics comparable to the signal 302 of FIG. 3.

An automatic gain control and automatic offset control circuit 424 can be coupled to the amplified signal 422a and can generate a controlled signal 424a, also indicated with a designation B.

A threshold generator circuit 428 can be coupled to the controlled signal 424a and can generate a threshold signal 428a.

The controlled signal 424a and the threshold signal 428a can be coupled to input nodes of a comparator 426 to generate a comparison signal 426a, also indicated with a designation B'. In some embodiments, the comparison signal 426a is a two state signal with high states and low states.

Magnetic field sensing elements 440a, 440c can be coupled in a differential arrangement to input nodes of an amplifier 442 to generate an amplified signal 442a. An automatic gain control and automatic offset control circuit 446 can be coupled to the amplified signal 442a and can generate a controlled signal 446a, also indicated with a designation C.

A threshold generator circuit 450 can be coupled to the controlled signal 446a and can generate a threshold signal 450a.

The controlled signal 446a and the threshold signal 450a can be coupled to input nodes of comparator 448 to generate a comparison signal 448a, also indicated with a designation C'. In some embodiments, the comparison signal 448a is a two state signal with high states and low states.

Magnetic field sensing elements 440b, 440c can be coupled in another differential arrangement to input nodes of an amplifier 452 to generate an amplified signal 452a.

The amplified signal 442a and the amplified signal 452a can both have characteristics comparable to the signal 304 of FIG. 3, having a time/phase shift relative to the signals 408a, 422a that changes with rotation angle of the target object.

An automatic gain control and automatic offset control circuit 454 can be coupled to the amplified signal 452a and can generate a controlled signal 454a, also indicated with a designation D.

A threshold generator circuit 458 can be coupled to the controlled signal 454a and can generate a threshold signal 458a.

The controlled signal 454a and the threshold signal 458a can be coupled to input nodes of a comparator 456 to generate a comparison signal 456a, also indicated with a designation D'. In some embodiments, the comparison signal 456a is a two state signal with high states and low states.

The magnetic field sensor 400 can also include a position detection module 428. The position detection module 428 can include a 4:2 multiplexer 430 coupled to the signals A and B (or alternatively, the signals A' and B'). The 4:2 multiplexer 430 can also be coupled to the signals C and D (or alternatively, the signals C' and D').

The 4:2 multiplexer 430 is operable to generate two signals 430a, 430b in one or more of the following combinations:

If signals A, B, C, D are used, then:
A, C,
B, D,
B, C, or
A, D

If signals A', B', C', D' are used, then:

A', C',
B', D',
B', C', or
A', D'.

The two signals 430a, 430b can be selected in accordance with a multiplexer control signal 436a.

The two signals 430a, 430b are coupled to a phase difference module 432 operable to identify a phase difference between the two signals 430a, 430b and operable to generate a phase difference signal 432a. Circuits described in figures below describe arrangements that can be used as the phase difference module 432.

A position decoder module 434 can be coupled to the phase difference signal 432a and can generate a position signal 434a indicative of a position (e.g., a rotation angle) of the target object 404a, 404b. To this end, in some embodiments, the position decoder module 434 can be a nonvolatile memory device that can act as a decoder between the phase difference signal 432a and the position signal 434a.

An element selection circuit 436 can be coupled to an element selection signal 438 from outside of the magnetic field sensor 400 and can be operable to generate the multiplexer control signal 436a to control which ones of the above-listed signals are used.

An output format module 420 can be coupled to one or more of the position signal 434a, the speed signal 412a, or the direction signal 418a. The output format module 420 can be operable to generate a formatted output signal 420a indicative of one or more of a position, a speed, or a direction of movement of the portions 404a, 404b of the target object.

The formatted output signal 420a can be in any one of a variety of formats, including, but not limited to, SPI (serial peripheral interface), PWM (pulse width modulation), I2C, and SENT (Single Edge Nibble Transmission).

In some embodiments, position information carried by the formatted signal 420a is present only during a time period proximate to a power up of the magnetic field sensor. In other embodiments, position information carried by the formatted signal 420a is present only during a time period proximate to first movement of the portions 404a, 404b of the target object after they have stopped. Thereafter, the formatted signal can be indicative of only one or more of the speed or the direction of movement of the portions 404a, 404b of the target object.

Operation of the magnetic field sensor is described in figures below. However, let it suffice here to say that a phase difference between the above-listed two signals 430a, 430b is indicative of an absolute rotation angle of the target object 404a, 404b.

In some embodiments, some of the elements of the magnetic field sensor 400 can be omitted. For example, in some embodiments, there is no selection of the two signals 430a, 430b, and instead, the two signal 430a, 430b are predetermined and hard wired, in which case, the 4:2 multiplexer 430, the element selection circuit 436, and circuits that generate unused ones of the signals A, B, C, D, A', B', C', D' can be omitted.

In some embodiments, the AGC/AOA circuits 410, 424, 446, 454 can be omitted and similar functions can instead be embedded within other modules, for example, within the phase difference module 432.

In some embodiments, the first one or more magnetic field sensing elements 406a, 406b, 406c can consist of only two magnetic field sensing elements 406a, 406b and the second one or more magnetic field sensing elements 440a, 440b, 440c can consist of only two magnetic field sensing elements 440a, 440b. In some embodiments, the first one or more magnetic field sensing elements 406a, 406b, 406c can consist of only one magnetic field sensing element 406a and the second one or more magnetic field sensing elements 440a, 440b, 440c can consist of only one magnetic field sensing element 440a.

Figure 5:
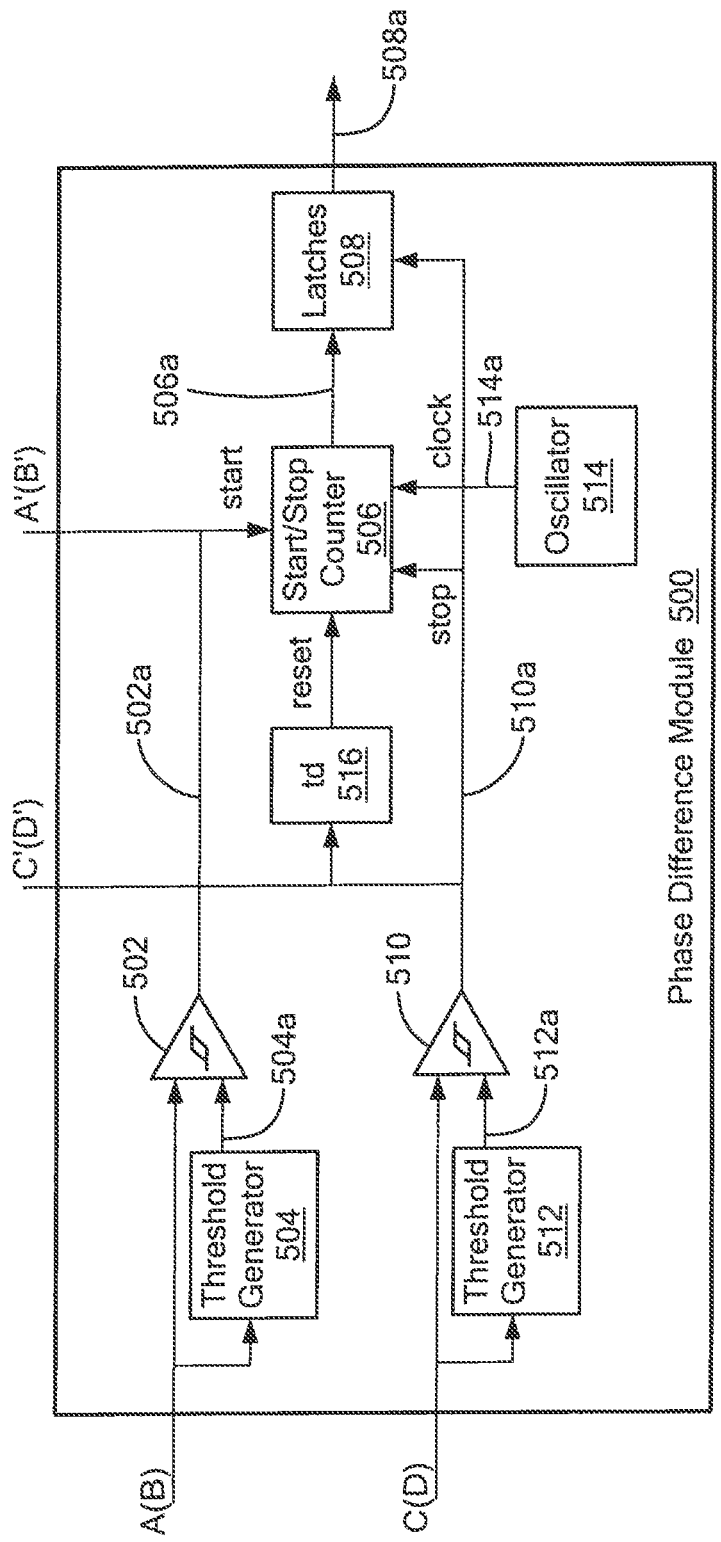
FIG. 5 is a block diagram showing further details of an illustrative phase difference module according to FIG. 4.

Referring now to FIG. 5, an illustrative phase difference module 500 can be the same as or similar to the phase difference module 432 of FIG. 4. It will be understood that a phase difference between two signals can be determined by a time difference between the two signals.

The phase difference module can be coupled to the two signals 430a, 430b of FIG. 4, which can be any of the two signals listed above.

If the signals A, B, C, D are used, then the phase difference module 500 can be coupled to the signals A or B and the signals C or D of FIG. 4.

A threshold generator 504 can identify a threshold associated with the signal A or B and can generate a threshold signal 504a. A threshold generator 512 can identify a threshold associated with the signal C or D and can generate a threshold signal 512a. In some embodiments, the threshold generators 504, 512 are operable to identify single thresholds, for example, at eighty, seventy, sixty, or fifty percent of as peak-to-peak range of respective input signals A, B, C, or D.

A comparator 502 can be coupled to the signal A or B and the threshold signal 504a and can generate a two-state comparison signal 502a. A comparator 510 can be coupled to the signal C or D and the threshold signal 512a and can generate a two-state comparison signal 510a.

A start/stop counter 506 can be coupled to the comparison signal 502a at a start input node and can be coupled to receive the comparison signal 510a at a stop input node, both nodes responsive to predetermined direction of state transitions. The start/stop counter 506 can generate a count signal 506a received at latches 508 operable to temporarily store the count signal 506a to generate a latched count signal 508a.

An oscillator 514 can generate a clock signal 514a received at a clock input node of the start/stop counter 506.

A time delay circuit 516 can be coupled to the comparison signal 510a and can generate a time delayed signal coupled to a reset input node of the start/stop counter 506 to reset the start/stop counter 506 shortly after the start/stop counter 506 is stopped by the comparison signal 510a.

The latches 508a can be latched upon a state of the comparison signal 510a being received at a latch input node of the latches 508a.

Count values from the latches 508 are indicative of a phase between the two signals A or B and C or D, in arbitrary units.

In an alternative embodiment, the signals A or B and C or D are not received by the phase difference module 500. In these embodiments, the signals A' or B' and C' or D' of FIG. 4 are received by the phase difference module 500. The signals A', B', C', and D' are already two-state signals. The signal A' or B' can be received at the start node of the start/stop counter 506 instead of the comparison signal 502a. The signal C' or D' can be received at the stop node of the start/stop counter 506 instead of the comparison signal 502a.

The phase difference module 500 determines a phase difference between two signals by measuring a time difference between the two signals. Essentially, the phase difference module 500 can identify time differences between points on the signals 302, 304 of FIG. 3 where they cross the threshold value 306. Embodiments described in conjunction with FIGS. 6 and 7 use other circuits to determine a phase difference between two signals.

Figure 6:
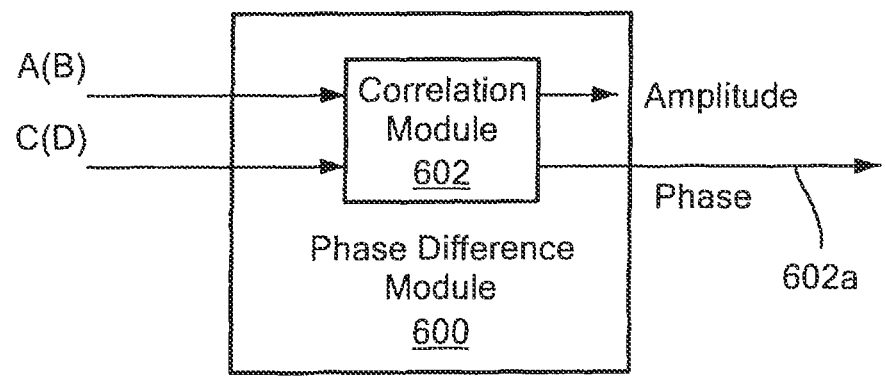
FIG. 6 is a block diagram showing further details of another illustrative phase difference module according to FIG. 4.

Referring now to FIG. 6, another illustrative phase difference module 600 can be the same as or similar to the phase difference module 432 of FIG. 4. The phase difference module 600 can include a correlation module 602 coupled to the signals A or B and the signals C or D of FIG. 4. Correlation is a technique that can identify a phase difference between two signals. Thus, the correlation module 602 can generate a phase signal 602a.

Figure 7:
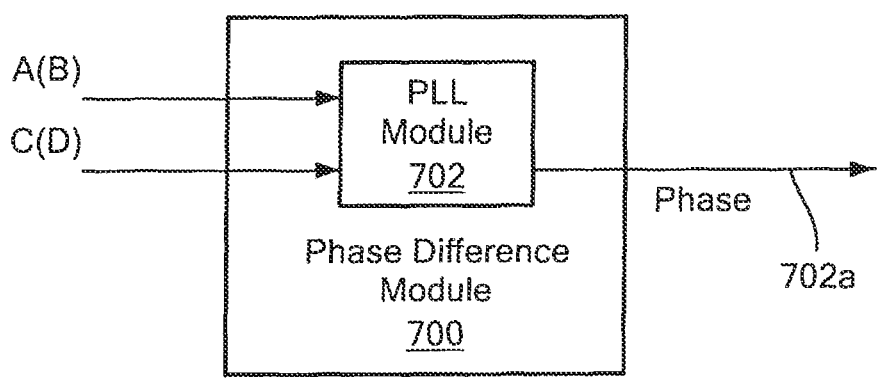
FIG. 7 is a block diagram showing further details of another illustrative phase difference module according to FIG. 4.

Referring now to FIG. 7, another illustrative phase difference module 700 can be the same as or similar to the phase difference module 432 of FIG. 4. The phase difference module 700 can include a phase locked loop (PLL) module 702 coupled to the signals A or B and the signals C or D of FIG. 4. A phase locked loop can identify a phase difference between two signals. Thus, the correlation module 702 can generate a phase signal 702a.

Figure 8:
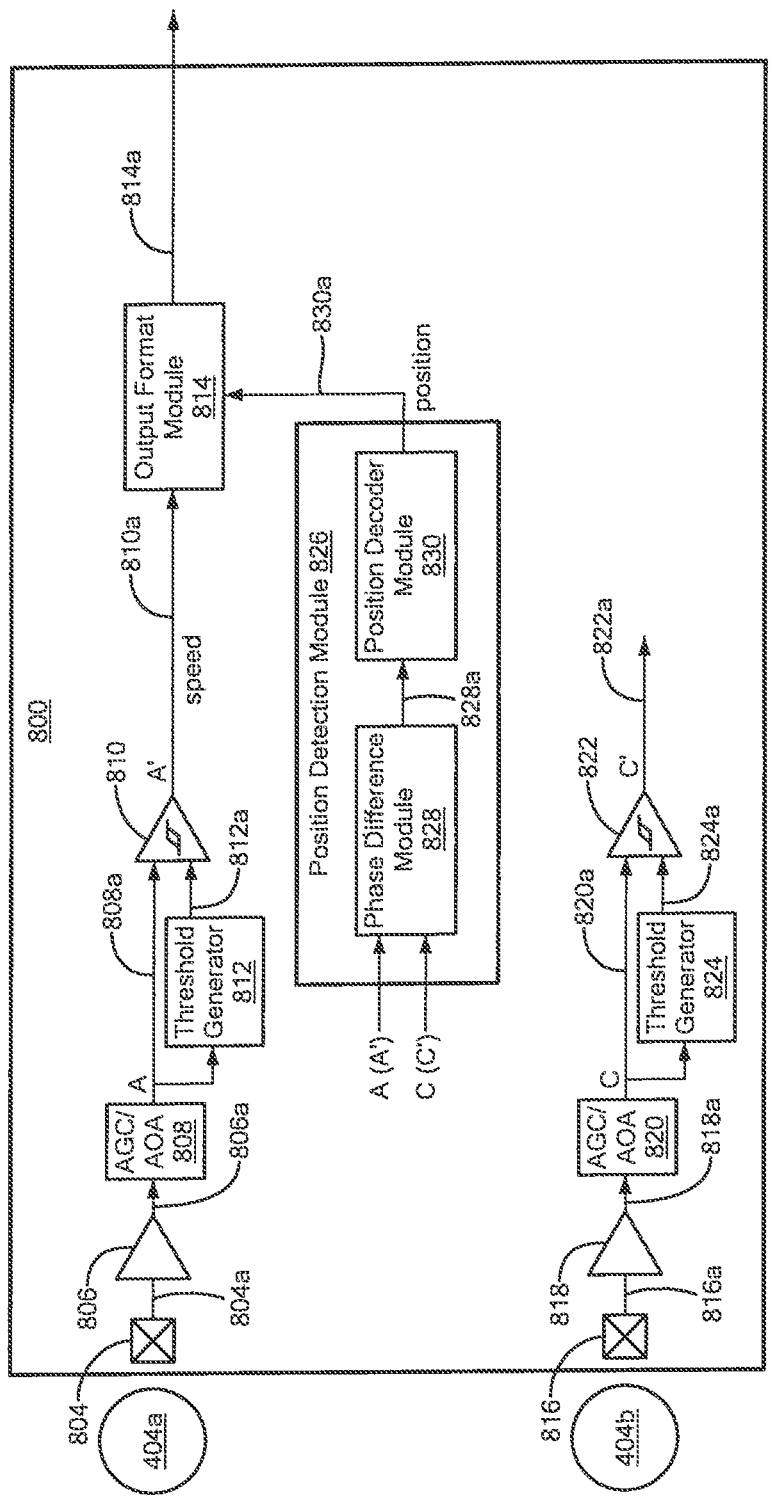
FIG. 8 is a block diagram showing another illustrative magnetic field sensor proximate to two target object portions, here shown to be separate, that can be like the magnetic field sensor and two portions of FIGS. 1 and 2, which can generate the signals of FIG. 3, and which can have a phase difference module operable to identify the phase difference between the signals of FIG. 3.

Referring now to FIG. 8, in which like elements of FIG. 4 are shown having like reference designations, a magnetic field sensor 800 can be disposed proximate to the first and second portions 404a, 404b of the target object. The magnetic field sensor 800 is a reduced version of the magnetic field sensor 400 of FIG. 4, and operates in substantially the same way.

A magnetic field sensing element 804 can be operable to generate a magnetic field signal 804a coupled to an amplifier 806. The amplifier 806 can be operable to generate an amplified signal 806a.

An AGC/AOA module 808 can be coupled to the amplified signal 806a and can generate a controlled signal 808a, also indicated with a designation A.

A threshold generator 812 can be coupled to the controlled signal 808a and can generate a threshold signal 812a.

The controlled signal 808a and the threshold signal 812a can be coupled to input nodes of comparator 810 to generate a comparison signal 810a, also indicated with a designation A'. In some embodiments, the comparison signal 810a is a two state signal with high states and low states. The comparison signal 810a can also be referred to as a speed signal for which a rate of transitions is indicative of a speed of rotation of the first and second portions 404a, 404b of the target object.

A magnetic field sensing element 816 can be operable to generate a magnetic field signal 816a coupled to an amplifier 818. The amplifier 818 can be operable to generate an amplified signal 818a.

An AGC/AOA module 820 can be coupled to the amplified signal 8018a and can generate a controlled signal 820a, also indicated with a designation C A threshold generator 824 can be coupled to the controlled signal 820a a and can generate a threshold signal 812a.

The controlled signal 820a and the threshold signal 824a can be coupled to input nodes of comparator 822 to generate a comparison signal 822a, also indicated with a designation C'. In some embodiments, the comparison signal 822a is a two state signal with high states and low states.

A phase difference module 828 can be coupled to the signals A and C or A' and C'. The phase difference module can be the same as or similar to the phase difference module 432 of FIG. 4. Because the signals A or C and A' or C' can be statically coupled to the phase difference module 828, the phase difference module need not be preceded by the multiplexer 430 of FIG. 4. However, in other embodiments, a multiplexer can be added to selected between the signals A or A' and C or C'.

The phase difference module can be operable to generate a phase signal 432a indicative of a phase difference between the signals A or A' and C or C'.

A position decoder module 830 can be coupled to the phase signal 828a a and can decode the phase signal 828a to produce position signal 830a similar to the position signal 432a of FIG. 4.

Figure 9:
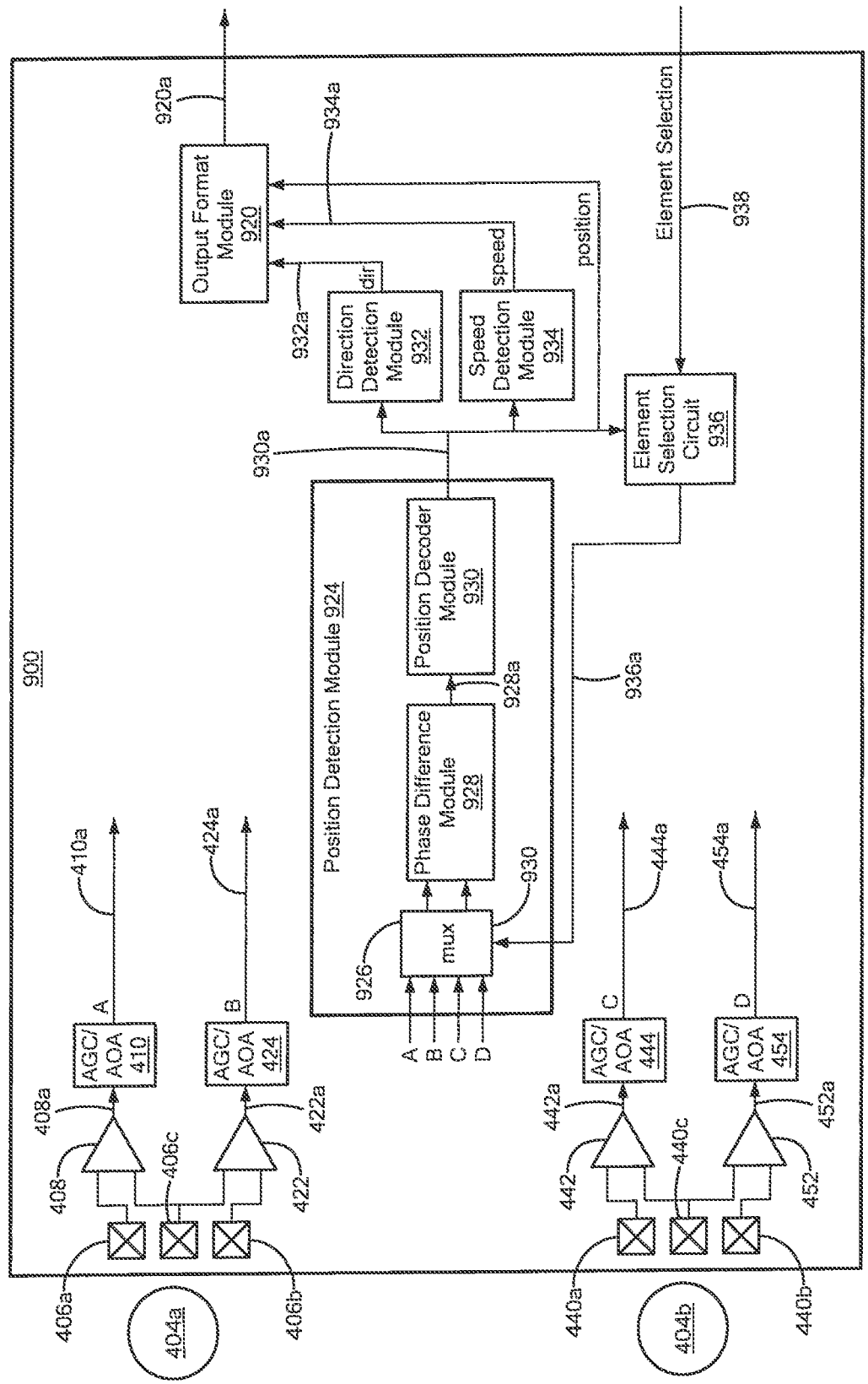
FIG. 9 is a block diagram showing another illustrative magnetic field sensor proximate to two target object portions, here shown to be separate, that can be like the magnetic field sensor and two portions of FIGS. 1 and 2, which can generate the signals of FIG. 3, and which can have a phase difference module operable to identify the phase difference between the signals of FIG. 3.

Referring now to FIG. 9, in which like elements of FIG. 4 are shown having like reference designations, magnetic field sensor 900 can employ other techniques to generate the speed and direction signals of FIG. 4. The magnetic field sensor 900 can have a position detection module that can be similar to the position detection module of FIG. 4, and that can generate a position signal 930a similar to the positions signal 434a of FIG. 4 indicative of a position (e.g., angle) of the portions 404a, 404b of the target object. It should be understood that, from the position signal 930a, both speed of movement and direction of the movement of the portions 404a, 404b of the target object can be calculated. To this end, some of the circuits of FIG. 4 can be omitted as shown in FIG. 9.

A speed detection module 934 can be coupled to the position signal 930a and can generate a speed signal 934a indicative of a speed or rate of movement of the portions 4040a, 404b of the target object.

A direction detection module 932 can be coupled to the position signal 930a and can generate a direction signal 932a indicative of a direction of the movement of the portions 4040a, 404b of the target object.

An element selection module 936 and multiplexer control signal 936a can be similar to the element selection module 436 and multiplexer control signal 436a of FIG. 4.

An output format module 920 and formatted signal 920a can be the same as or similar to the output format module and formatted signal 420a of FIG. 4.

Figure 10:
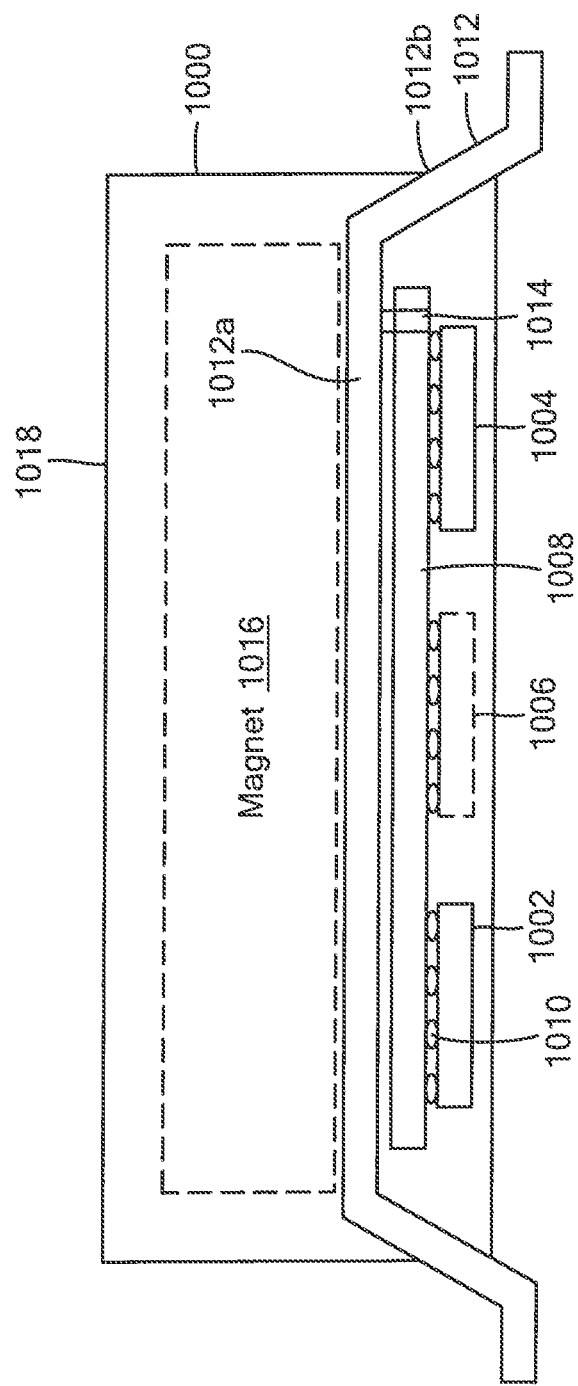
FIG. 10 is a block diagram of a side view of an illustrative magnetic field sensor that can be like the magnetic field sensor of FIGS. 1 and 2.

Referring now to FIG. 10, a magnetic field sensor 1000 can be illustrative of a mechanical arrangement of any of the magnetic field sensors of figures above.

The magnetic field sensor 1000 can include a first semiconductor substrate 1002 upon which can be disposed the first one or more magnetic field sensing elements 406a, 406b, 406c of FIG. 4 of 804 of FIG. 8. The magnetic field sensor 1000 can also include a second semiconductor substrate 1004 upon which can be disposed the second one or more magnetic field sensing elements 440a, 440b, 440c of FIG. 4 or 816 of FIG. 8. With the two substrates, the groups of magnetic field sensing elements can be more widely separated than would otherwise be possible if all of the magnetic field sensing elements were disposed on a single semiconductor substrate.

In some embodiments, other elements of the magnetic field sensor 400 of FIG. 4 or 800 of FIG. 8 can be disbursed among the first and second semiconductor substrates. However, in another embodiment, some of the other elements can be disposed upon an optional third semiconductor substrate 1006.

The semiconductor substrates 1002, 1004, 1006 can be coupled to a base substrate 1008, which can be comprised of a semiconductor or insulator (e.g., ceramic) material. The coupling to the base substrate can be made by solder balls, e.g., 1010, or the like. Interconnecting traces upon the base substrate 1008 can make interconnections between the semiconductor substrates 1002, 1004, 1006.

The base substrate 1008 can be coupled to a base plate 1012a of a lead frame 1012 with couplings, e.g., 1014, to make connection to leads, e.g., 1012b, of the lead frame 1012. In some embodiments, the leads, e.g., 1012b, can be formed into a surface mount configuration.

In back biased arrangements used to sense a movement of a ferromagnetic target object, a permanent magnet 1016 can be disposed proximate to the substrates 1002, 1004, 1006. In other embodiments used to sense a ring magnet, the permanent magnet 1016 can be omitted.

A solid molded enclosure 1018 can surround parts of the magnetic field sensor 1000 as shown.

In some alternate embodiments, the magnetic field sensors described above are disposed entirely upon one substrate.

Figure 11:
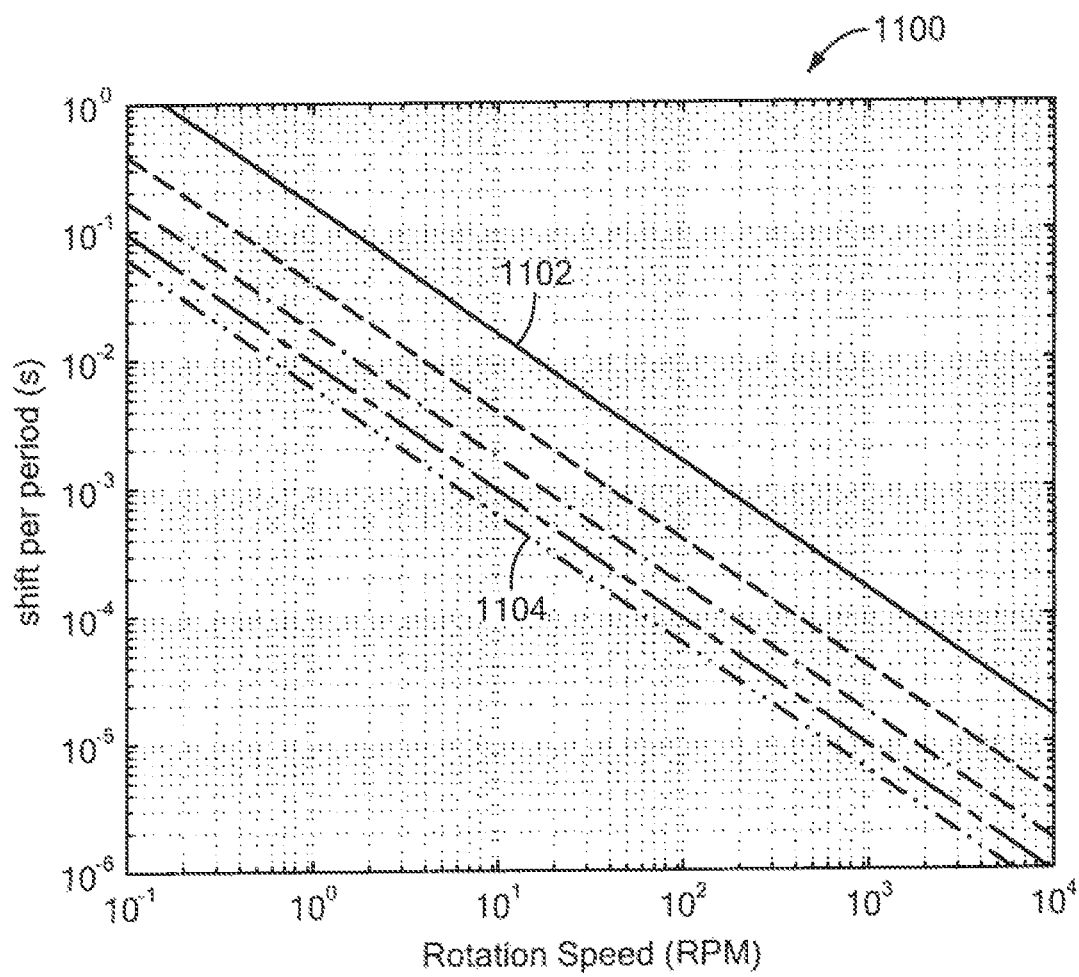
FIG. 11 is a graph showing phase shift per period of the first and second signals of FIG. 3 and for different quantities of the target features of FIGS. 1 and 2.

Referring now to FIG. 11, a graph 1100 has a horizontal axis with a scale in units of rotation speed of the portions 404a, 404b of the target object of FIG. 4 in unit of revolutions per minute. The graph 1100 has a vertical axis with a scale in units of time shift per period in units of seconds. The time shift is essentially the shift identified in FIG. 3, where the shift changes with each cycle of the signals 302, 304.

A line 1102 is indicative of one of the portions, e.g., 404a of FIG. 4, of the target object having twenty teeth and the other portion having twenty-one teeth. A line 1104 is indicative of one of the portions, e.g., 404a of FIG. 4, of the target object having one hundred teeth and the other portion having one hundred one teeth. Other lines on the graph 1100 are at intervals of twenty teeth.

From the graph 1100 it can be seen that the shift per period is less for higher rotation speeds. Also, the shift per period is less for target objects with greater numbers of teeth (or poles). For embodiments using the time shift from FIG. 3 to determine absolute angle, a time resolution of the magnetic field sensor can limit the maximum allowable rotation speed at which absolute angles can be reliably determined. The graph 1100 serves to predict the maximum allowable rotation speed for a number of target combinations. For example, from the graph 1100, for a magnetic field sensor that can resolve time shifts greater than or equal to one hundred microseconds, assuming a pair of targets with twenty and twenty one features (line 1102), the maximum target speed would be approximately two thousand revolutions per minute.

Figure 12:
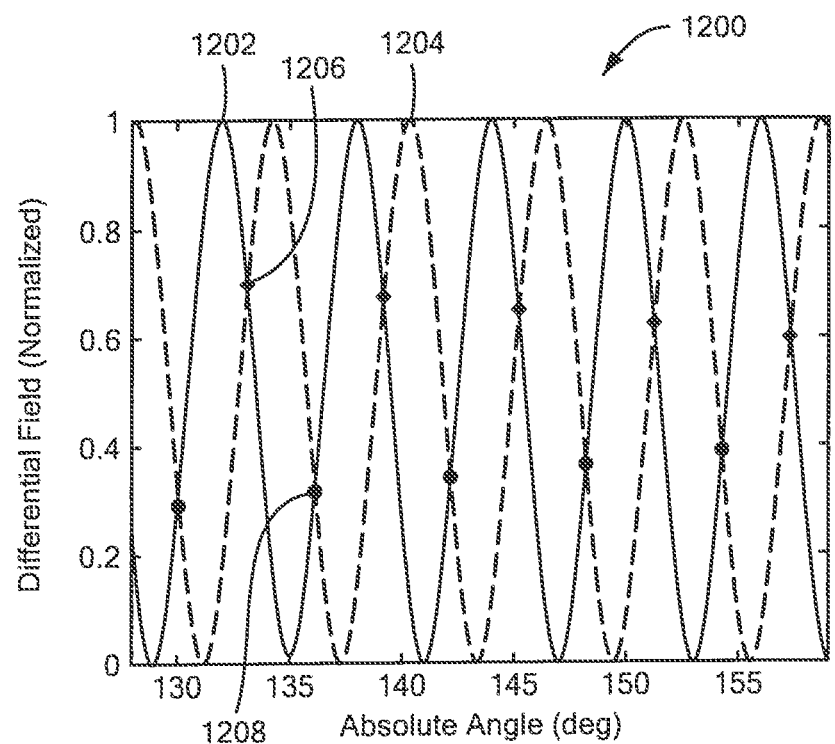
FIG. 12 is a graph showing illustrative signals generated by the first and second one or more magnetic field sensing elements of FIGS. 1 and 2, and also rising and falling crossing-points that can be used to detect angular position of the target object when the target object rotates.

Referring now to FIG. 12, a graph 1200 has a horizontal axis with a scale in units of absolute angle of the target object 106 of FIG. 1, having two target object portions, in units of degrees, and a vertical axis with a scale in units of differential magnetic field in normalized arbitrary units related to that which would be experienced by two magnetic field sensing elements taken differentially. In some embodiments, the differential field can be identified by a difference of signals from the magnetic field sensing elements S1, S2, S3 of FIG. 2, e.g., S1-S2, which is like signal 1202, and a difference of signals from the magnetic field sensing elements S4, S5, S6 of FIG. 2, e.g., S4-S5, which is like the signal 1204.

The graph 1200 shows first and second signals 1202, 1204 that are similar to the signals 302, 304 of FIG. 3. The absolute angle of the horizontal axis is similar to the time on the horizontal axis of FIG. 3. Here, unlike FIG. 3, the signals 1202, 1204 are not compared to a threshold (e.g., 306 of FIG. 3), but instead, proximate (in time) crossings (e.g., 1206, 1208, respectively) of the first and second signals 1202, 1204 are identified.

Like the time shifts shown on FIG. 3, which change depending upon rotation angle of the target object, here, it should be apparent that vertical locations of the crossings (e.g., 1206, 1208) change with rotation angle of the target object. In order to uniquely identify all absolute angles of the target, the magnetic field sensor can distinguish between crossings at which the slope of signal 1204 is positive and crossings at which the slope of signal 1204 is negative at the time of each crossing. Magnetic field sensors described below in conjunction with FIGS. 14 and 21 use this behavior. Magnetic field sensors described herein can use one, the other, or both the crossings at the positive slope of the signals 1204 and crossings at the negative slope of the signal 1204.

Figure 13:
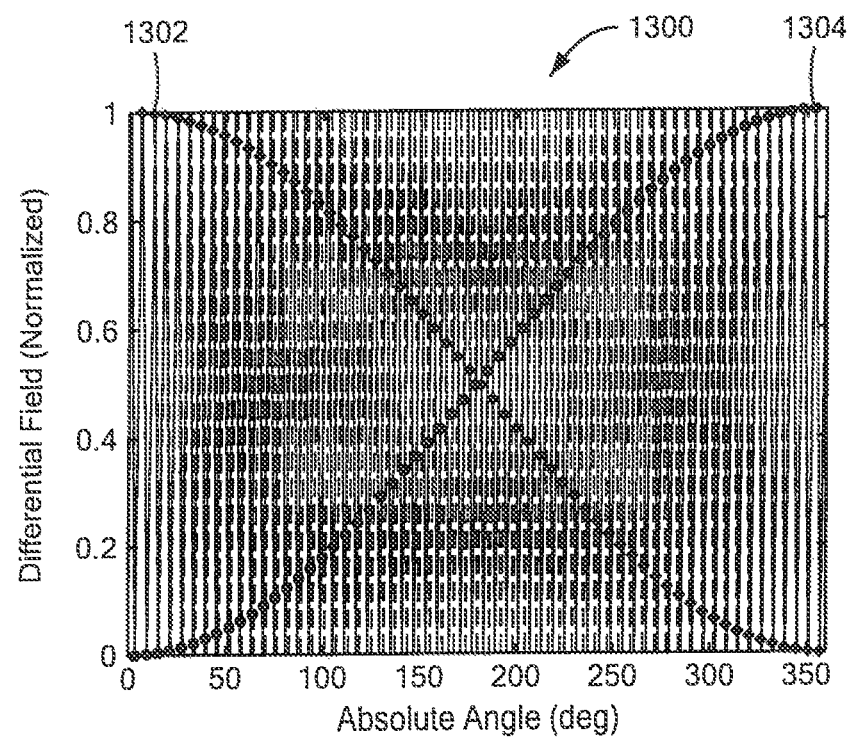
FIG. 13 is a graph showing the signals of FIG. 12, but on a wider time scale.

Referring now to FIG. 13, a graph 1300 has the same axes as those of the graph 1200 of FIG. 12. Here, however, the horizontal axis has a wider angle scale. Points 1302 are indicative of signal crossings for which the slope of signal 1204 is positive, while points 1304 are indicative of signal crossings for which the slope of signal 1204 is negative. These points are like those of FIG. 12, but are visible throughout a range of angular rotations of the target object 106 of FIGS. 1 and 2. It should be apparent that some embodiments can use either the crossings 1302 at the positive slope of the signal 1204 or crossings 1304 at the negative slope of the signal 1204. Either can uniquely identify the absolute angle.

Other embodiments can use a difference between proximate crossings, e.g. points 1206, 1208 of FIG. 12, in order to determine the absolute position of the target. In this case, it is both the difference between proximate crossings and the sign of the difference that are indicative of the angle of rotation. It should be apparent that these embodiments can use both the crossings at the positive slope of the signal 1204 and crossings at the negative slope of the signal 1204.

Figure 14:
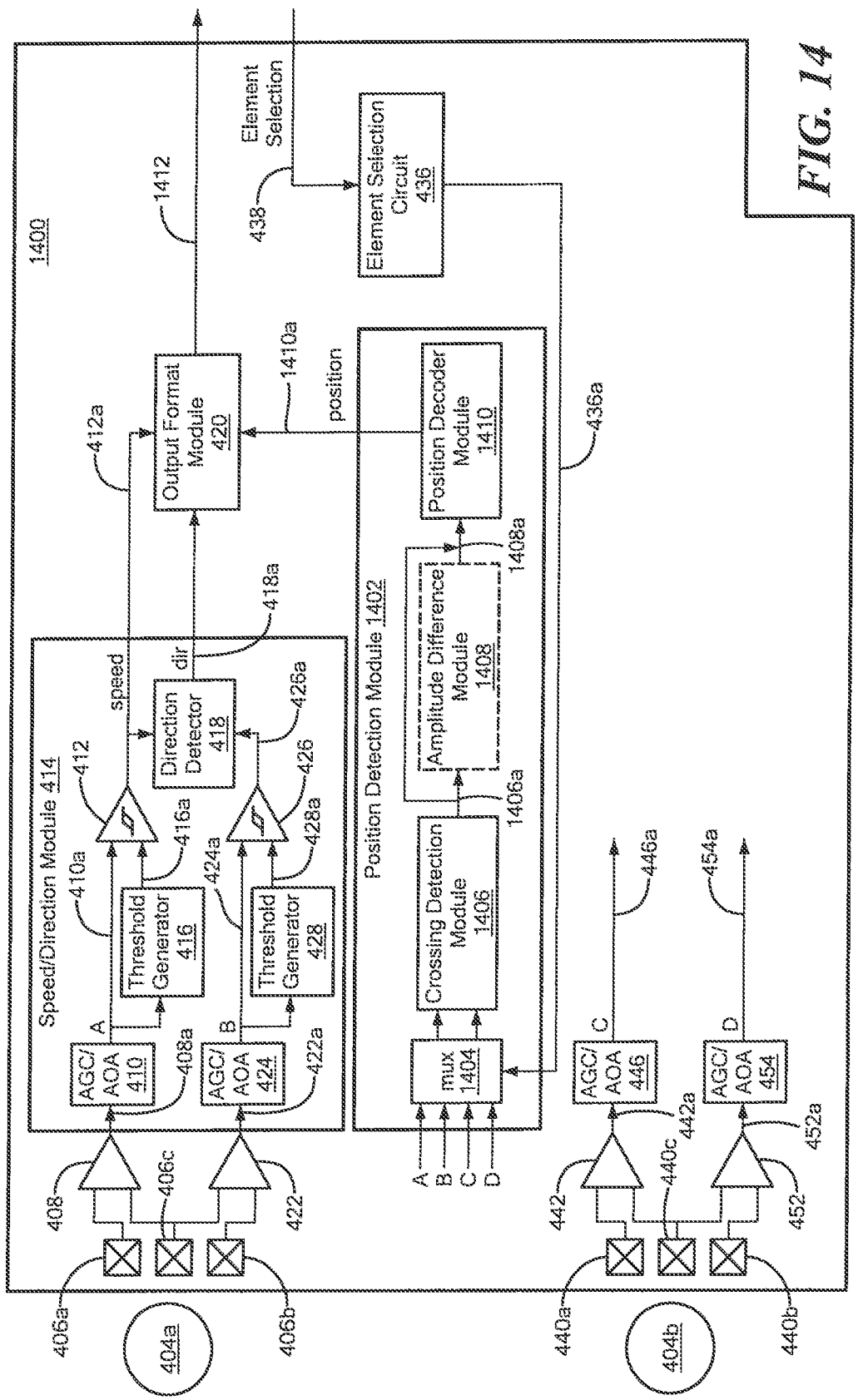
FIG. 14 is a block diagram showing an illustrative magnetic field sensor proximate to two target object portions, here shown to be separate, that can be like the magnetic field sensor and two portions of FIGS. 1 and 2, which can generate the signals of FIGS. 10 and 11, and which can have a crossing detection module and an amplitude difference module to identity an amplitude difference between the upper and lower crossings of the signals of FIGS. 12 and 13.

Referring now to FIG. 14, in which like elements of FIG. 4 have like reference designations, the position detection mode 428 of FIG. 4 is replaced by a position detection module 1402 that makes use of the signal crossing difference of FIGS. 12 and 13.

The position detection module can include a 4:2 multiplexer 1404 similar to the 4:2 multiplexer 430 of FIG. 4. However, only the signal A or B and C or D are received by and used by the 4:2 multiplexer 1404.

The 4:2 multiplexer 1404 can select and generate two signals (see, e.g., signal 1202, 1204 of FIG. 12) from the group of two signals:

A, C
B, D
A, D
B, C

The selection is determined in accordance with a multiplexer control signal 436a.

The selected two signals can be coupled to a crossing detection module 1406 operable to detect some of or all of the crossings of the two signals received by the crossing detection module. An illustrative crossing detection module is described below in conjunction with FIG. 15. The crossing detection module 1406 can be operable to generate a crossing signal 1406a indicative of the detected crossings of the two signals.

Optionally, (shown as phantom lines) an amplitude difference module 1408 can identify a difference of amplitudes between proximate crossings of the crossing signal 1406a. The amplitude difference module 1408 can generate a difference signal 1408a indicative of the difference of amplitudes, which, as identified in conjunction with FIGS. 12 and 13, is indicative of an angle of rotation of the first and second portions 404a, 404b of the target object.

A position decoder module 1210 can be coupled to the crossing signal 1406a (or optionally, to the difference signal

1408a) and can be operable to generate a position signal 1410a indicative of a position (e.g., angular position) of the target object.

Output format module 420 can generate a formatted signal that can be the same as or similar to the formatted signal 420a of FIG. 4.

Figure 15:
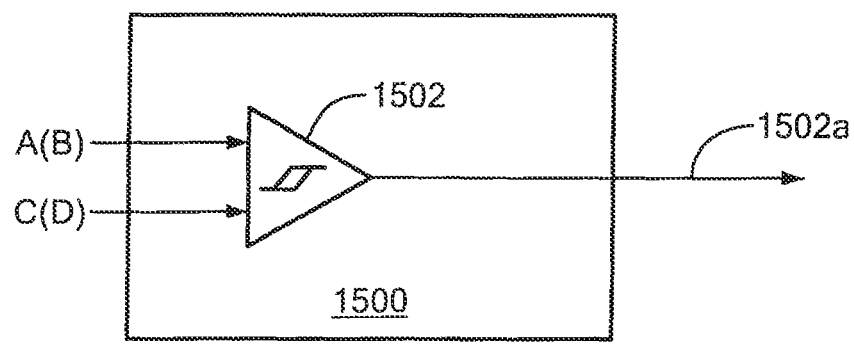
FIG. 15 is a block diagram showing an illustrative amplitude difference module that can be used as the amplitude difference module of FIG. 14.

Referring now to FIG. 15, an illustrative crossing detection module 1500 can include a comparator 1502 to generate a crossing signal 1502a indicative of crossings of the signals A or B and C or D. The crossing signal 1502a can be the same as or similar to the crossing signal 1406a of FIG. 14.

Figure 16:
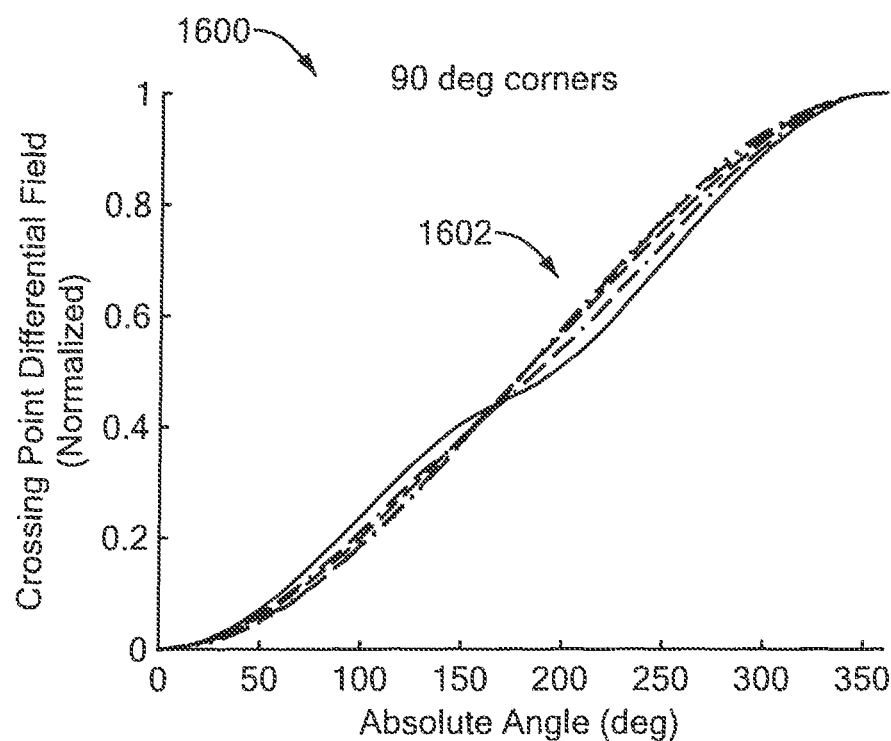
FIG. 16 is a graph showing a simulated relationship between rising crossing points of the signals of FIGS. 12 and 13 and angle of a target object for different air gaps and for a target object in the form of a gear having teeth (features) with ninety degree edges and in a back-biased arrangement.
Figure 17:
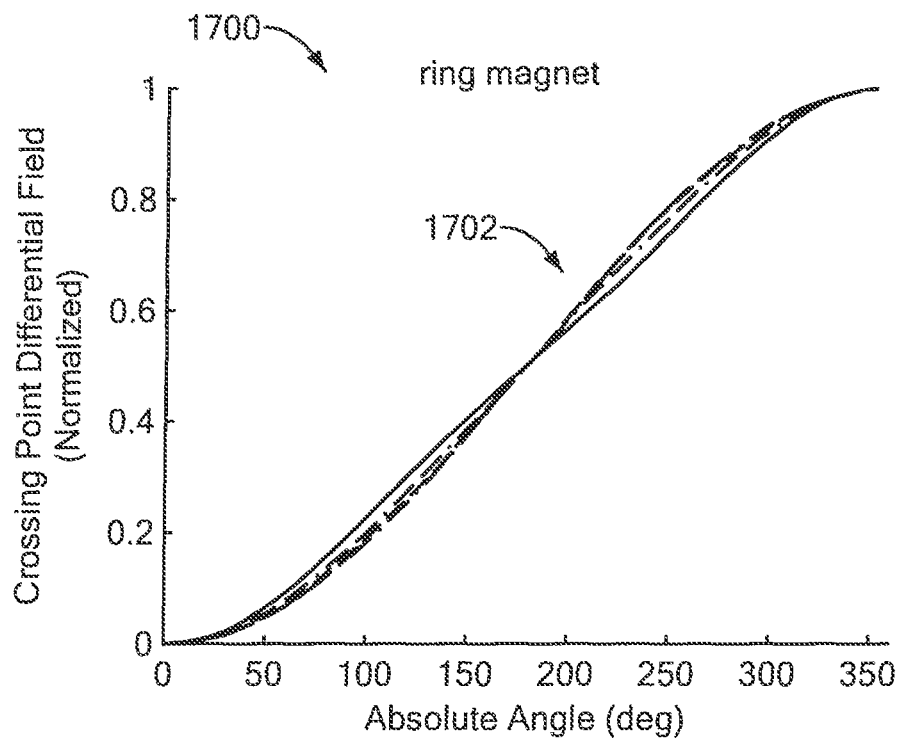
FIG. 17 is a graph showing a simulated relationship between rising crossing points of the signals of FIGS. 12 and 13 and angle of a target object for different air gaps and for a target object in the form of a ring or circular magnet having poles (features)

Referring now to FIGS. 16 and 17, graphs 1600 and 1700 each include a horizontal axis with a scale in units of rotation angle of the portions 404a, 404b of the target object of FIG. 14 in degrees and each include a vertical axis with a scale in units of normalized differential magnetic field at which crossing points of two signals occur (e.g., points 1304 in FIG. 13). Points 1602 are indicative of only one set of crossings of the signals 1202 and 1204 of FIG. 12, e.g., crossings 1304 of FIG. 13. The other set of crossings, e.g., 1302 of FIG. 13 is omitted for clarity.

In some embodiments, a first signal is generated by a difference of signals from the magnetic field sensing elements S1, S2, S3 of FIG. 2, e.g., S1-S2, which is like signal 1202, and a second signal crossing the first signal is generated by a difference of signals from the magnetic field sensing elements S4, S5, S6 of FIG. 2, e.g., S4-S5.

A plurality of curves 1602 on the graph 1600 is indicative of a back-biased arrangement for sensing rotation of a ferromagnetic gear having teeth with ninety degree corners, for different air gaps between the magnetic field sensor 1400 of FIG. 14 and the target object, the air gaps spanning between 0.5 mm and 3.0 mm in increments of 0.5 mm. The data in FIG. 16 were simulated assuming a pair of targets with sixty and sixty-one teeth.

Similarly, a plurality of curves 1702 on the graph 1700 is indicative of a non back-biased arrangement for sensing rotation of a ring or circular magnet having north and south poles around a circumference of the ring or circular magnet, for different air gaps between the magnetic field sensor 1400 of FIG. 14 and the target object, the air gaps spanning between 0.5 mm and 3.0 mm in increments of 0.5 mm. The data in FIG. 16 were simulated assuming a pair of ring-magnet targets with sixty and sixty-one pole pairs.

An illustrative installed unit-to-unit tolerance for the air gap is about +/−0.5 mm.

For both of the graphs 1600, 1700 it should be apparent that the variation of crossing points with rotation angle may not be straight line linear and may change depending upon air gap. Circuits and techniques described below in conjunction with FIGS. 19, 20, and 21 can mitigate this variation.

Figure 18:
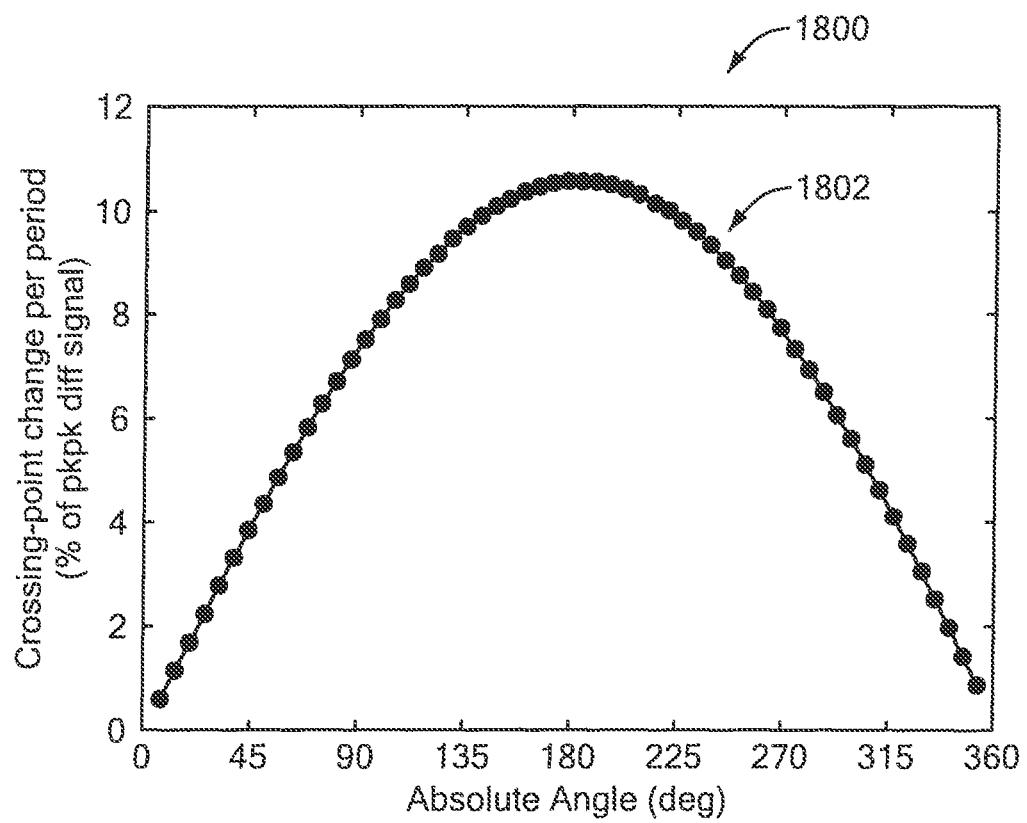
FIG. 18 is a graph showing a first derivative of the data (at one air gap) from FIG. 16 in terms of change per period.

Referring now to FIG. 18, a graph 1800 has a horizontal axis with a scale in units of rotation angle in degrees of the portions 404a, 404b of the target object described above in conjunction with FIG. 14. The graph 1800 also has a vertical axis with a scale in units of crossing point change per tooth-valley period for one set of crossings, e.g., crossings 1304 of FIG. 13. Points 1802 are indicative of rates of change of the one set of crossings of the two signals 1202, 1204 of FIG. 12, e.g., crossings 1304 of FIG. 13.

Referring briefly to FIG. 13, for two target object portions, e.g., 404a, 404b of FIG. 14, that differ by one tooth or one pole pair, a crossing point change per period of curve 1304 is highest near one hundred eighty degrees of rotation of the target object and lowest for rotation angles near zero and three hundred sixty degrees of rotation.

A limiting factor for accurate determination of the absolute angle in this embodiment is the capability of the magnetic field sensor to resolve the differential field at which each crossing point occurs. This is the most difficult for rotation angles near zero and three hundred sixty degrees of rotation, where the crossing point change per period is small, as shown in FIG. 18.

Figures 19, 20:
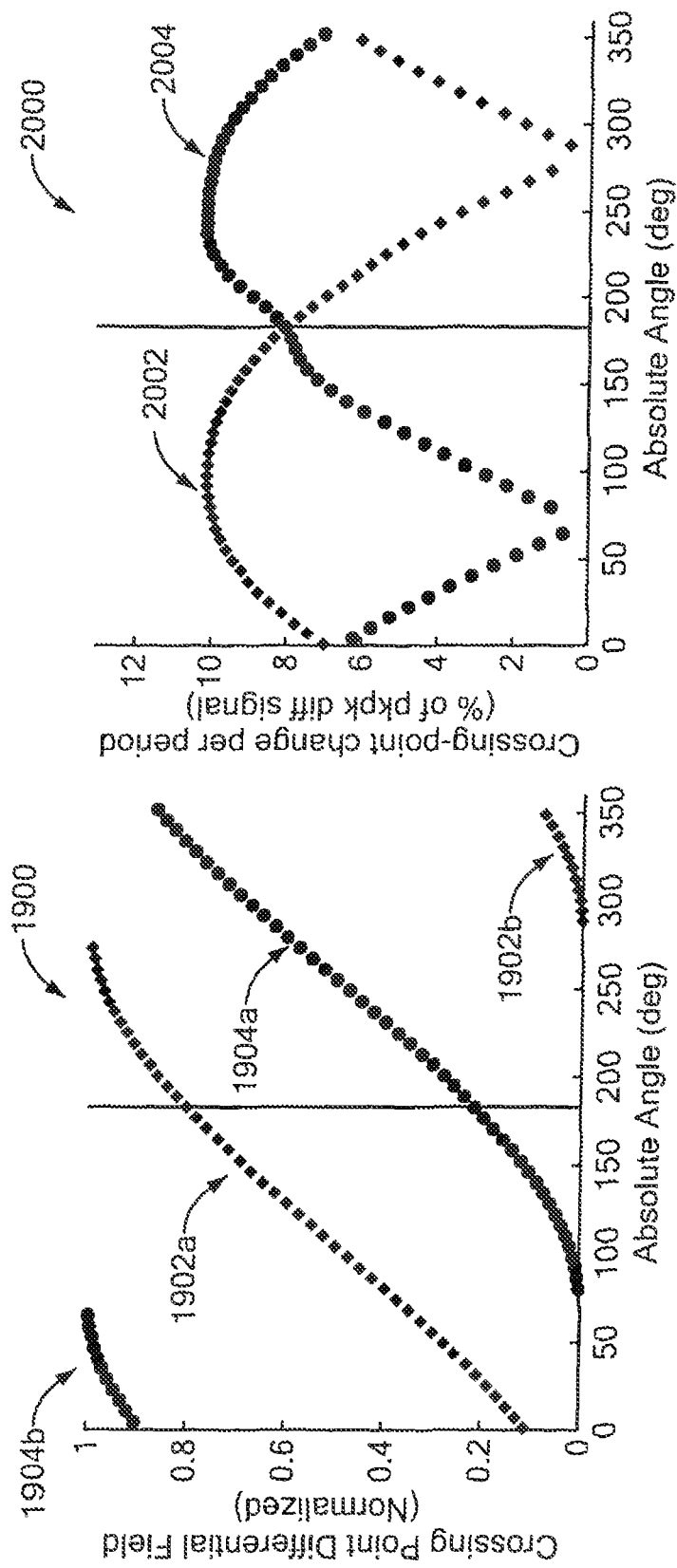
FIG. 19 is a graph showing two simulated relationships like the relationship of FIG. 14, but for two different pairings of the magnetic field sensing elements of FIGS. 1 and 2.
FIG. 20 is a graph showing two simulated relationships like the relationship of FIG. 18, but for two different pairings of the magnetic field sensing elements of FIGS. 1 and 2.

Referring now to FIG. 19, a graph 1900, which is like the graph 1600 of FIG. 16, includes a horizontal axis with a scale in units of rotation angle of the portions 404a, 404b of the target object of FIG. 14 in degrees, and a vertical axis with a scale in units of differential magnetic field crossing points (see FIG. 16 for an explanation of the vertical axis).

With regard to accuracy deficiencies at some rotation angles described above in conjunction with FIG. 18, relatively high sensitivity can be maintained at all rotation angles if a strategy is adopted using different pairs of sensing elements in FIG. 2 at different rotation angles of the target object, e.g. S3-S2 crossing S5-S4 (1902a and 1902b) at some rotation angles, and, S2-S1 crossing S6-S5 (1904a and 1904b) at other rotation angles.

This strategy of using offset pairs of sensing elements shifts the absolute angle at which the maximum slope of the simulated data in FIG. 19 occurs away from one hundred eighty degrees when compared to the simulations in FIGS. 16-17.

FIG. 20 is similar to FIG. 18. A set of crossing point changes per tooth-valley period 2002 shows slopes of the set of points 1902a, 1902b of FIG. 19. A set of crossing point changes per second 2004 shows slopes of the set of points 1904a, 1904b of FIG. 19.

It is desirable to maintain a high rate of change of the crossings of the two signals to maximize angle sensitivity. Thus, for example, for rotation angles of the target object between about zero and one hundred eighty degrees, the set of points 2002 can be used according to crossings generated by S3-S2 crossing S5-S4 (see FIGS. 1 and 2), and for angles of the target object between about one hundred eighty degrees and three hundred sixty degrees, the set of points 2004 can be used according to crossings generated by S2-S1 crossing S6-S5.

Figure 21:
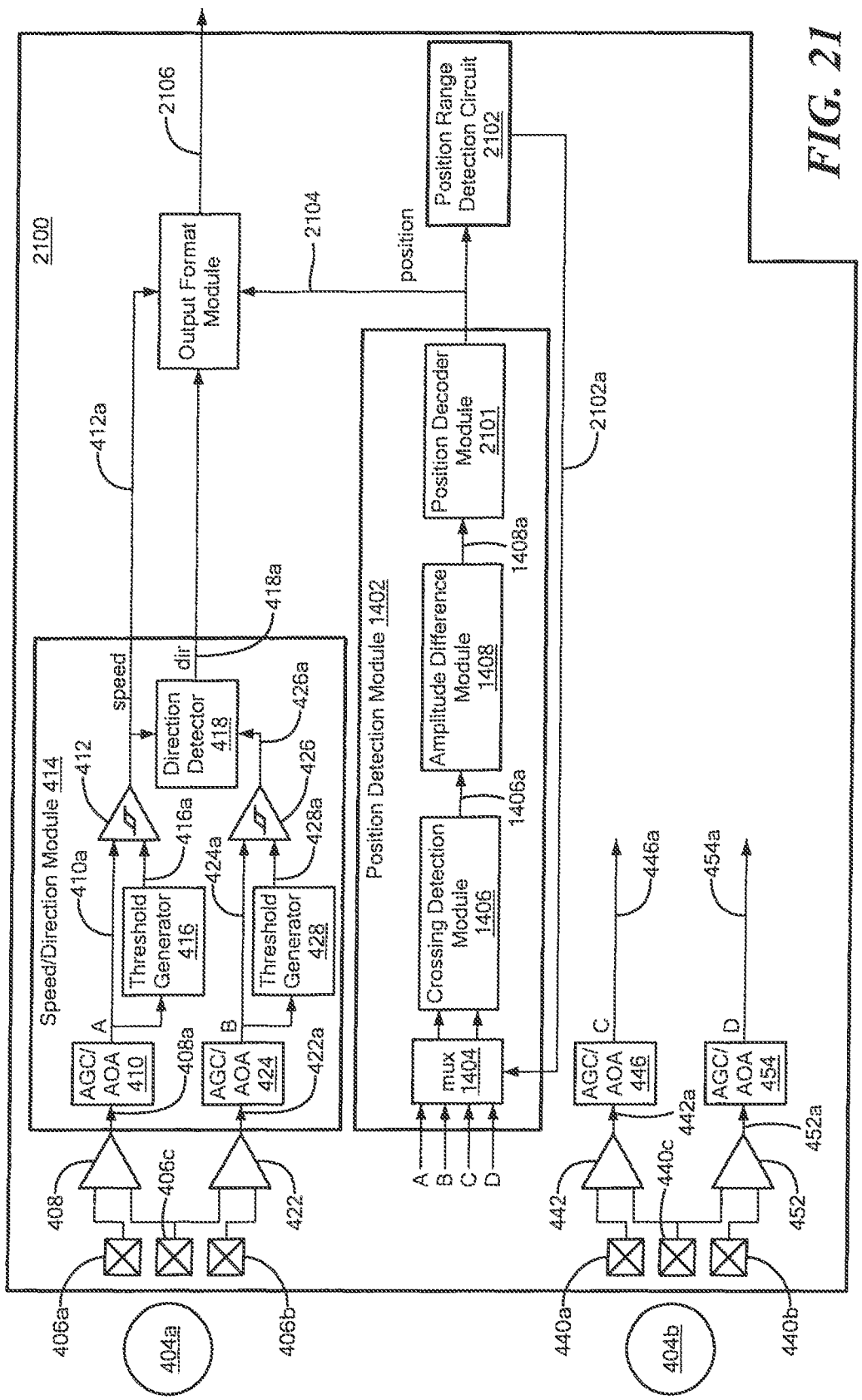
FIG. 21 is a block diagram showing another illustrative magnetic field sensor proximate to two target object portions, here shown to be separate, that can be like the magnetic field sensor and two portions of FIGS. 1 and 2, which can generate the signals of FIGS. 12 and 13, which can have a crossing detection module and an amplitude difference module to identity an amplitude difference between the upper and lower crossings of the signals of FIGS. 12 and 13, and which has a position range detection module to switch magnetic field sensing elements according to the graphs if FIGS. 19 and 20.

Referring now to FIG. 21, in which like elements of FIGS. 4 and 14 are shown having like reference designations, a magnetic field sensor 2100 is like the magnetic field sensor 1400 of FIG. 14, except that the element selection circuit 436 of FIG. 14 is replaced by a position range detection circuit 2102 that can generate a multiplexer control signal 2102a that can change connections of the 4:2 multiplexer 1404 during a rotation of the portions 404a, 404b of the target object. In some embodiments, the magnetic field sensor 2100 can control the 4:2 multiplexer 1404 to use signals A and C during a first selected one hundred eighty degrees of rotation of the target object and to use signals B and D during a second selected one hundred eighty degrees of rotation of the target object. Other signal combinations are also possible.

The position decoder module 1410 of FIG. 14 can also be replaced by a position decoder module 2101 that can account for the phase shift of the crossing signals depicted in FIGS. 19 and 20 in accordance with different signals selected by the 4:2 multiplexer 1404.

Figure 22:
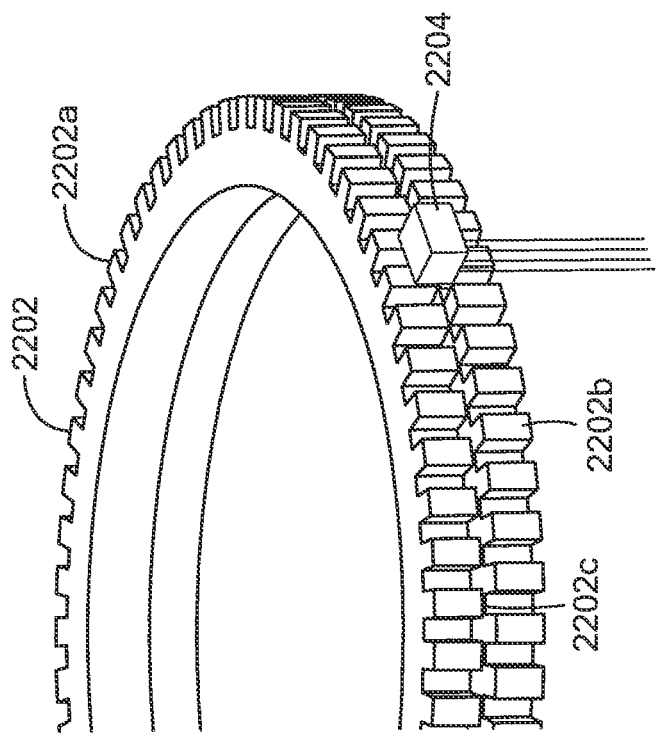
FIG. 22 is a pictorial showing a perspective view of another magnetic field sensor proximate to a target object, the target object having first and second portions, wherein the first and second portions have different numbers of target features, and wherein the magnetic field sensor has one or more magnetic field sensing elements disposed proximate to a junction between the first portion and second portion.

Referring now to FIG. 22, a magnetic field sensor 2204 can sense an absolute position of a target object 2202. The target object 2202 has a first portion 2202a having a first quantity of target features and a second portion 2202b having a second quantity of target features different than the first quantity. The first and second portions 2202a, 2202b are proximate and mechanically fixed together. The target object 2202, including the first and second portions 2202a, 2202b, is capable of a movement (e.g., a rotation). The magnetic field sensor 2204 can include one or more magnetic field sensing elements disposed proximate to a mechanical intersection 2202c to sense both the first and second portions 2202a, 2202b of the target object 2202 with the same one or more magnetic field sensing elements. The one or more magnetic field sensing elements are operable to generate a first magnetic field signal responsive to the movement of both the first and second portions 2202a, 2202b. Described in conjunction with FIG. 25 below, the magnetic field sensor 2202 can include a position detection module operable to use the first magnetic field signal to generate a position signal (i.e., values) indicative of the absolute position and an output format module coupled to receive the position value and to generate an output signal from the magnetic field sensor indicative of the absolute position.

The magnetic field sensor 2204 is disposed at a different position relative to a target object 2202 than that shown in FIGS. 1 and 2. However, the target object 2202 can be the same as or similar to the target object 106 of FIGS. 1 and 2. Unlike the magnetic field sensor 102 of FIGS. 1 and 2, the magnetic field sensor 2204 is disposed proximate to the junction 2202c between first and second portions 2202a, 220b of the target object 2202.

Figure 23:
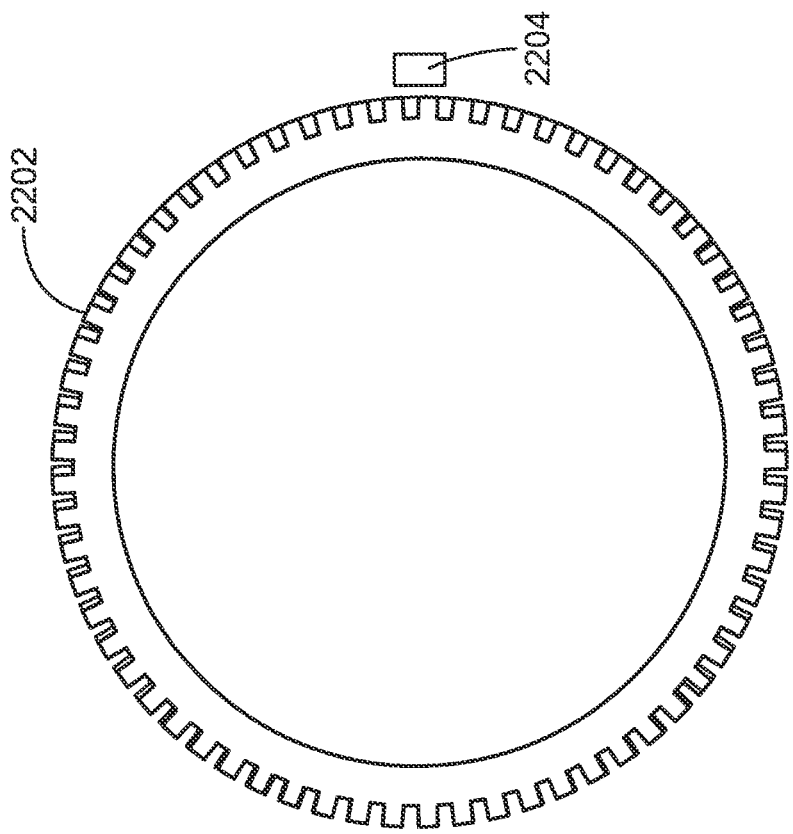
FIG. 23 is a pictorial diagram showing a side view of the magnetic field sensor and target object of FIG. 22.

Referring now to FIG. 23, in which like elements of FIG. 22 are shown having like reference designations, the magnetic field sensor 2204 is disposed proximate to a junction 2202c between first and second portions 2202a, 2200b of the target object 2202. In this view, it can be seen that, at some rotations of the target object, valleys of the first portion 2202a of the target object 2202 are proximate to valleys of the second portion 2202b, and at other rotations of the target object, valleys of the first portion 2202a are proximate to teeth of the second portion 2202b.

The magnetic field sensor 2204 can experience influence from the first and second portions 2202a, 2202b together at the same time.

While the target object 2202 is shown as a gear having teeth and valleys, in other embodiments, a ring or circular magnet can be used with alternating north and south poles around its circumference.

Figure 24:
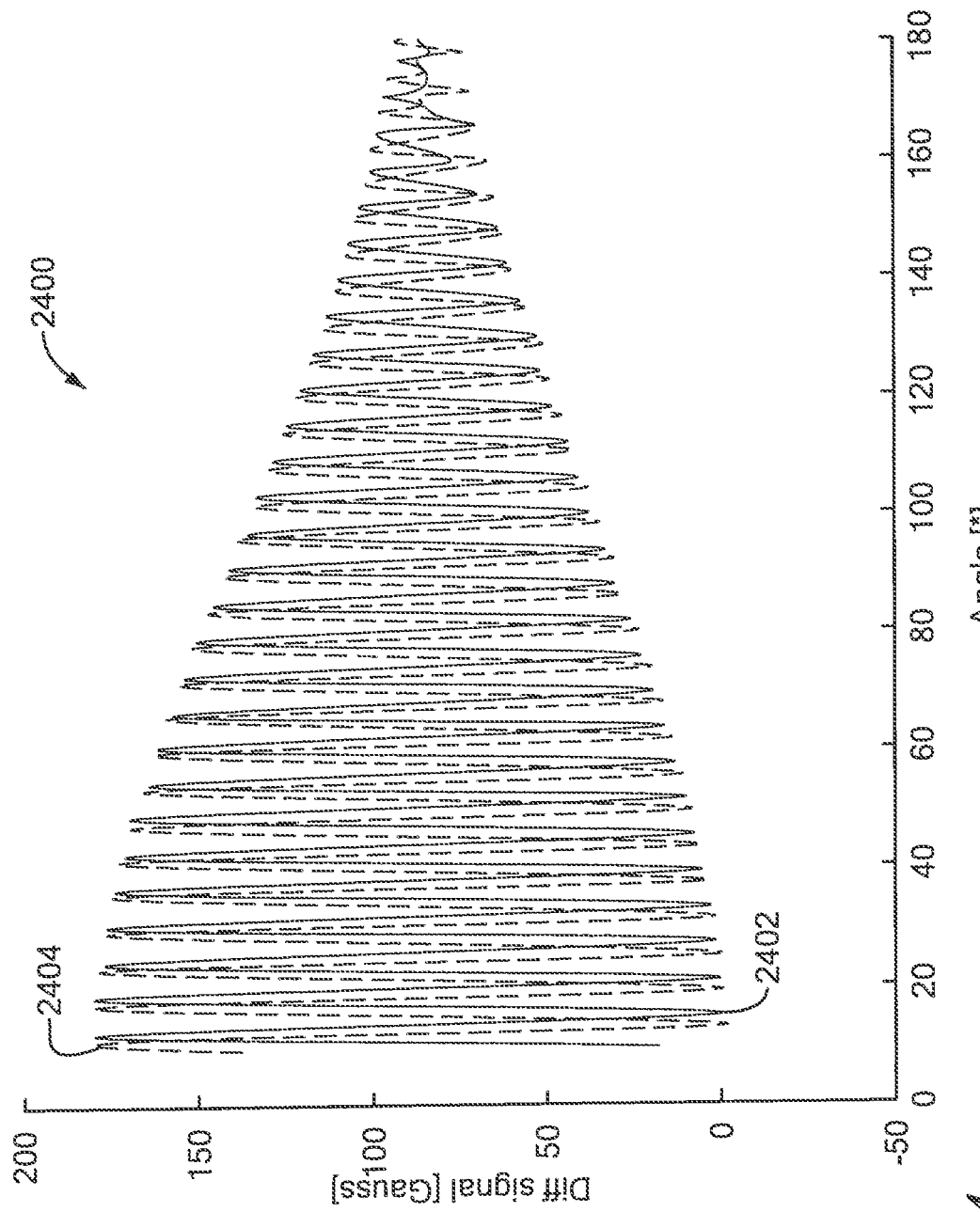
FIG. 24 is a graph showing two signals that can be generated by the magnetic field sensing elements of FIG. 22.

Referring now to FIG. 24, a graph 2400 has a horizontal axis with a scale in units of rotation angle of the target object 2202 of FIGS. 22 and 23. The graph 2400 also has a vertical axis with a scale in units of differential magnetic field in Gauss experienced by the magnetic field sensor 2204 of FIGS. 1 and 2.

The graph 2400 has two signals 2402, 2404. The two signals are signals generated within the magnetic field sensor 2204 as the target object rotates. At some rotations of the target object the magnetic field sensor 2204 is proximate to like features of the two portions 2202a, 2202b of the target object 2200, e.g., teeth to north poles. At other rotations, the magnetic field sensor is proximate to opposing features, e.g., a tooth and a valley or a north pole and south pole. An amplitude of one of or both of the signals 2402, 2404 can be detected by a magnetic field sensor 25 described below.

Figure 25:
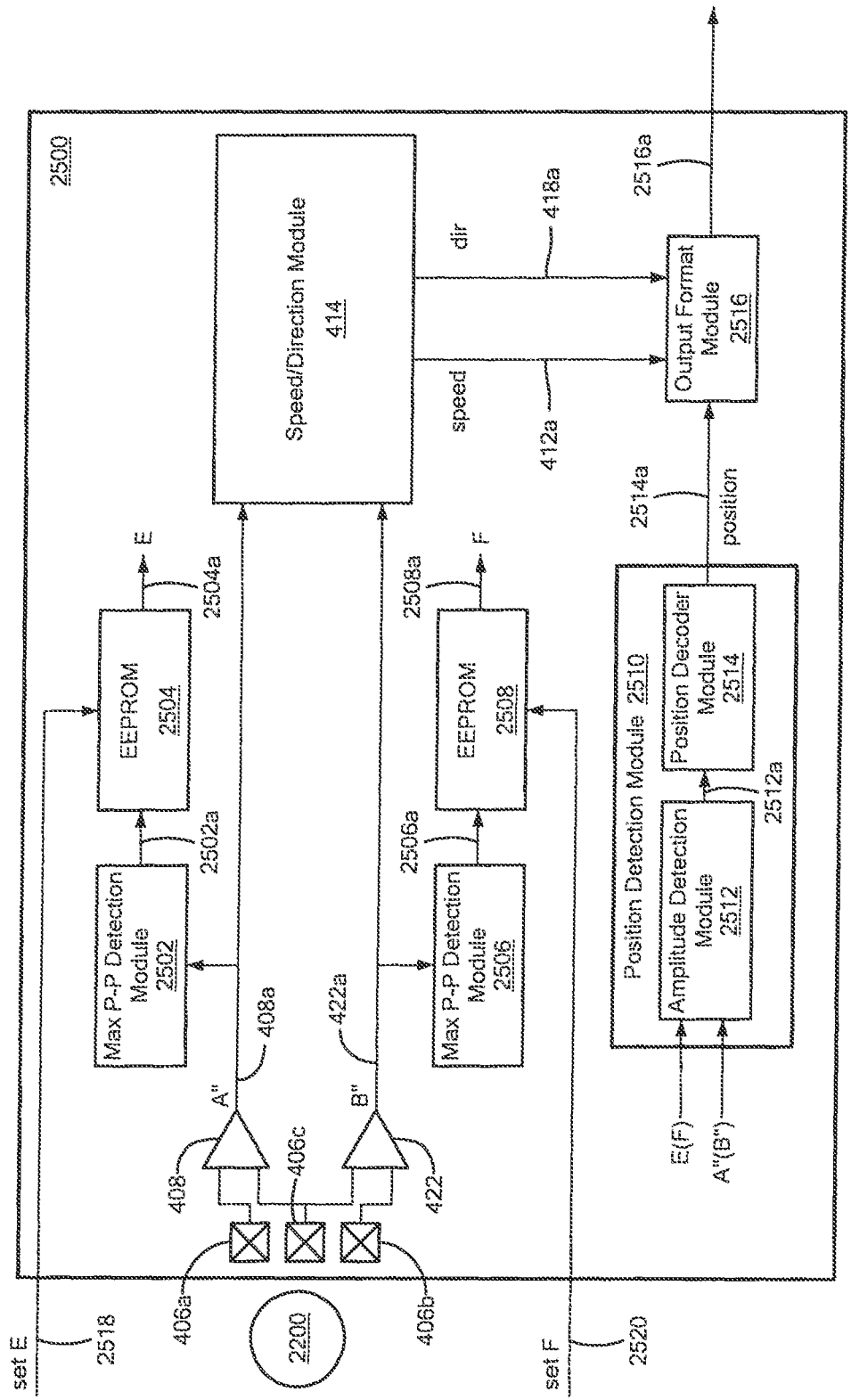
FIG. 25 is a block diagram showing an illustrative magnetic field sensor proximate to two target object portions, here shown to be conjoined, that can be like the magnetic field sensor and two portions of FIGS. 22 and 23, which can generate the signals of FIG. 24, and which can have an amplitude detection module operable to identify an amplitude of the signals of FIG. 24.

Referring now to FIG. 25, in which like elements of FIG. 4 are shown having like reference designations, a magnetic field sensor 2500 can be disposed proximate to the target object 2202 of FIGS. 22 and 23.

The magnetic field senor 2500 can generate the amplified signals 408a, 422a of FIG. 4, also identified as A" and B", similar to signals A and B of FIG. 4. The signals A" and B" can be received by the speed/direction module 414 of FIG. 4 to generate the speed signal 412a and the direction signal 418a of FIG. 4.

A maximum peak-to-peak detection module 2502 can receive the amplified signal 408a and can identify and generate a maximum peak-to-peak value 2502a of the amplified signal 408a determined as the target object 2200 rotates.

A non-volatile memory 2504, e.g., an EEPROM, can store the maximum peak-to-peak value 2502a. The non-volatile memory 2504 is operable to provide a stored maximum peak-to-peak value 2504a, also identified as a signal E.

A maximum peak-to-peak detection module 2506 can receive the amplified signal 422a and can identify and generate a maximum peak-to-peak value 2506a of the amplified signal 422a determined as the target object 2200 rotates.

A non-volatile memory 2508, e.g., an EEPROM, can store the maximum peak-to-peak value 2506a. The non-volatile memory 2508 is operable to provide a stored maximum peak-to-peak value 2508a, also identified as a signal F.

A position detection module 2510 can include an amplitude detection module 2512 coupled to at least one of the signal A" or the signal B" and coupled to at least one of the stored maximum peak-to-peak values E or F. The amplitude detection module 2512 can be operable to identify a relative amplitude of at least one of the signal A" or the signal B" in view of at least one of the stored maximum peak-to-peak values E or F. The relative amplitude can be indicative of a rotation angle of the target object. See also FIG. 24. The amplitude detection module 2512 can be operable to generate an amplitude signal 2512a (i.e., one or more amplitude values) indicative of the rotation angle.

A position decoder module 2514 can be coupled to the amplitude signal 2512a and can be operable to generate a position signal 2514a (i.e., position values) indicative of the rotation angle.

An output format module can be coupled to at least one of the position signal 2514a, the speed signal 412a, or the direction signal 418a and can be operable to generate an output signal 2516a indicative of at least one of the speed of rotation, the direction of rotation, and the absolute rotation angle of the target object.

Characteristics of the output signal 2516a can be the same as or similar to characteristics of the output signal 420a of FIG. 4 described above.

In some embodiments, the nonvolatile memory 2504 can be coupled to a "set E" signal 2518 to set the maximum peak-to-peak value stored in the non-volatile memory 2504 to an initial value at start up. Similarly, in some embodiments, the nonvolatile memory 2508 can be coupled to a "set F" signal 2520 to set the maximum peak-to-peak value stored in the non-volatile memory 2508 to an initial value at start up. Values can be updated and stored in the nonvolatile memories 2504, 2508 during run time of the magnetic field sensor 2500.

In some embodiments, some of the electronic circuits of the magnetic field sensor 2500 can be omitted. For example, magnetic field sensing element 406b, amplifier 422, maximum peak-to-peak detection module 2506, and nonvolatile memory 2508 can be omitted. In this case, some of the speed/direction module 414 can also be omitted.

Figure 26:
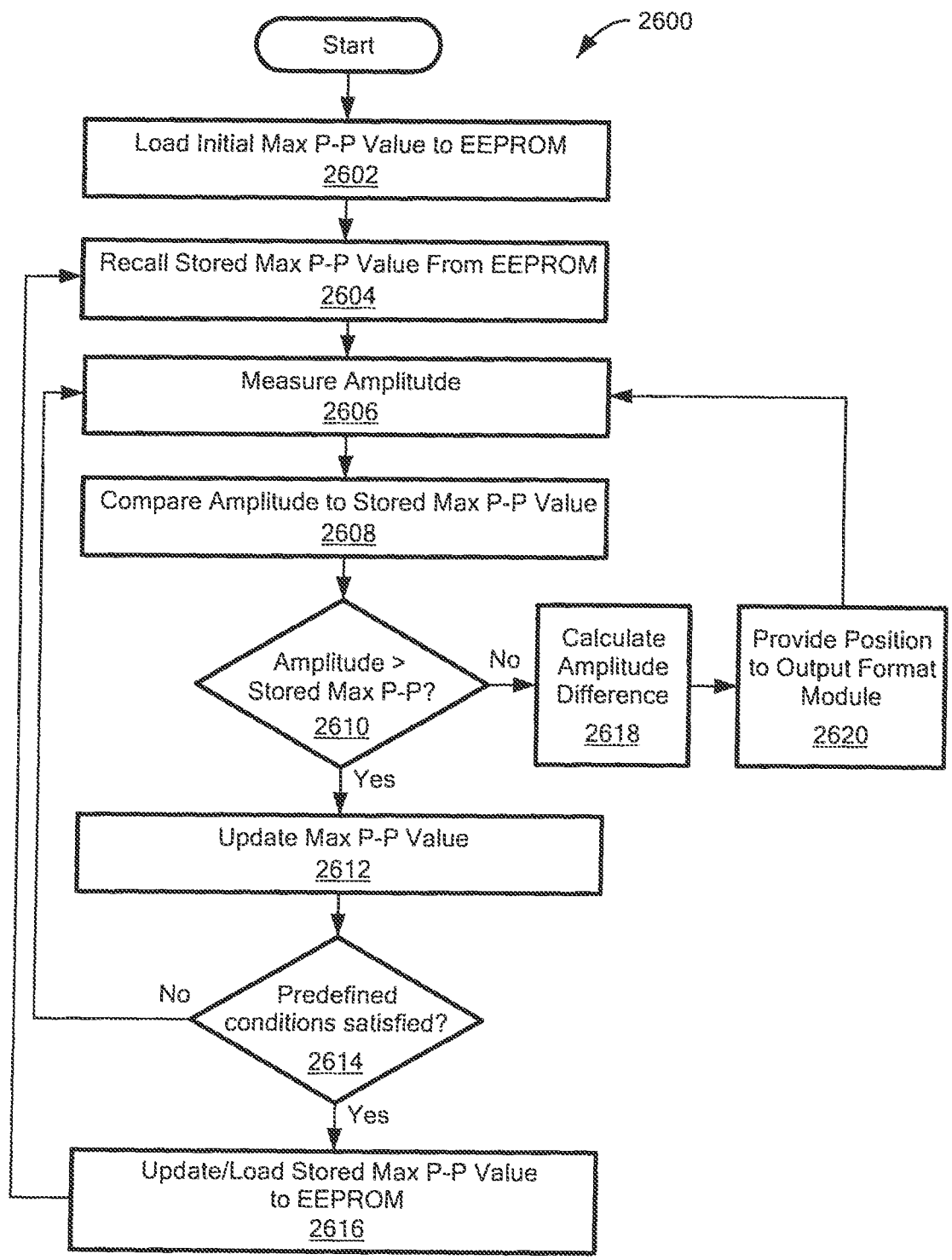
FIG. 26 is a flow chart showing an illustrative process that can be used by the amplitude detection module of FIG. 25.

It should be appreciated that FIG. 26 shows a flowchart corresponding to the below contemplated technique which would be implemented in a magnetic field sensor (e.g., FIGS. 25 and 27). Rectangular elements (typified by element 2602 in FIG. 26), herein denoted "processing blocks,"

represent computer software instructions or groups of instructions. Diamond shaped elements (typified by element 2614 in FIG. 26), herein denoted "decision blocks," represent logic, or groups of logic, which affect the execution of processing blocks.

The processing and decision blocks can represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Referring now to FIG. 26, with reference to FIG. 25, a process 2600 can be used in the magnetic field sensor 2500 of FIG. 25. At block 2602, initial values can be loaded into the EEPROM 2504 an/or into the EEPROM 2508 via the signal 2518 and/or the signal 2520. The initial values can be representative of a predetermined approximate maximum peak-to-peak value of the signals A and/or B.

At block 2604, the stored maximum peak-to-peak values can be recalled from the EEPROM 2504 and/or the EEPROM 2508 and conveyed to the amplitude detection module 2512.

At block 2606, the amplitude detection module can measure values of amplitudes of the signals A" and/or B" as the target object 2200 rotates.

At block 2608 the amplitude detection module can compare the measured value(s) of the amplitude with the stored maximum peak-to-peak value(s) from the EEPROM 2604 and/or the EEPROM 2508.

At block 2618, if the measure amplitude(s) is/are not larger than the stored maximum peak-to-peak values(s) then at block 2618, the measured amplitude(s) can be used according to FIG. 24 to determine a rotation angle of the target object 2200 by determining how much smaller the measured amplitude value(s) is/are than the stored maximum peak-to-peak value(s).

At block 2620, using the position decoder module 2514, the calculated amplitude difference(s) can be converted into a position signal (i.e., position values) 2514*a*. Then, the process 2600 can return to block 2606.

On the other hand, if at block 2610, the measured amplitude values(s) is/are greater than the stored maximum peak-to-peak value(s), then it is known that the stored maximum peak-to-peak value(s) is/are not correct. Thus, the process moves to block 2612, where the maximum peak-to-peak value(s) is/are updated accordingly, but not yet sent to the EEPROM(S) 2504 and or 2508 for storage.

At block 2614, predetermined conditions of the magnetic field sensor can be examined. For example, the updated maximum peak-to-peak values can be examined to determine if they are within a predetermined range of maximum peak-to-peak value that is proper. An improper maximum peak-to-peak value may be indicative of for example, a malfunctioning magnetic field sensing element 406*a*, 406*b*, 406*c*. An improper maximum peak-to-peak value may also be indicative of only a momentary electrical or magnetic noise spike in the signals 408*a*, 422*a*. For another example, in some embodiments, the magnetic field sensor can include a temperature sensor and, if the temperature is not within predetermined limits, updates to the stored maximum peak-to-peak value(s) may be stopped. For another example, in some embodiments, the magnetic field sensor can perform only one update to the stored maximum peak-to-peak value(s) per power cycle of the magnetic field sensor.

At block 2614, if the predefined (i.e., predetermined) conditions are met, then the process proceeds to block 2616, where maximum peak-to-peak value(s) stored in the EEPROMS(s) 2504 and/or 2508 is/are updated. The process returns to block 2604.

On the other hand, if at block 2614, the predefined conditions are not met, then the EEPROM(s) 2504 and/or 2508 are not updated and the process returns to block 2606. The process can also generate a flag value to indicate that the predefined conditions were not met.

From language above should be apparent that only one of the signals A", B" and one of the signals E'", F'" is necessary. However, if they are all present, the magnetic field sensor 2500 can calculate two amplitude differences and two position signals (values) comparable to position signal 2514*a*. In this case, the two position values can be combined, for example, averaged together, or they can be separately provided as part of the formatted output signal 2516*a*.

Figure 27:
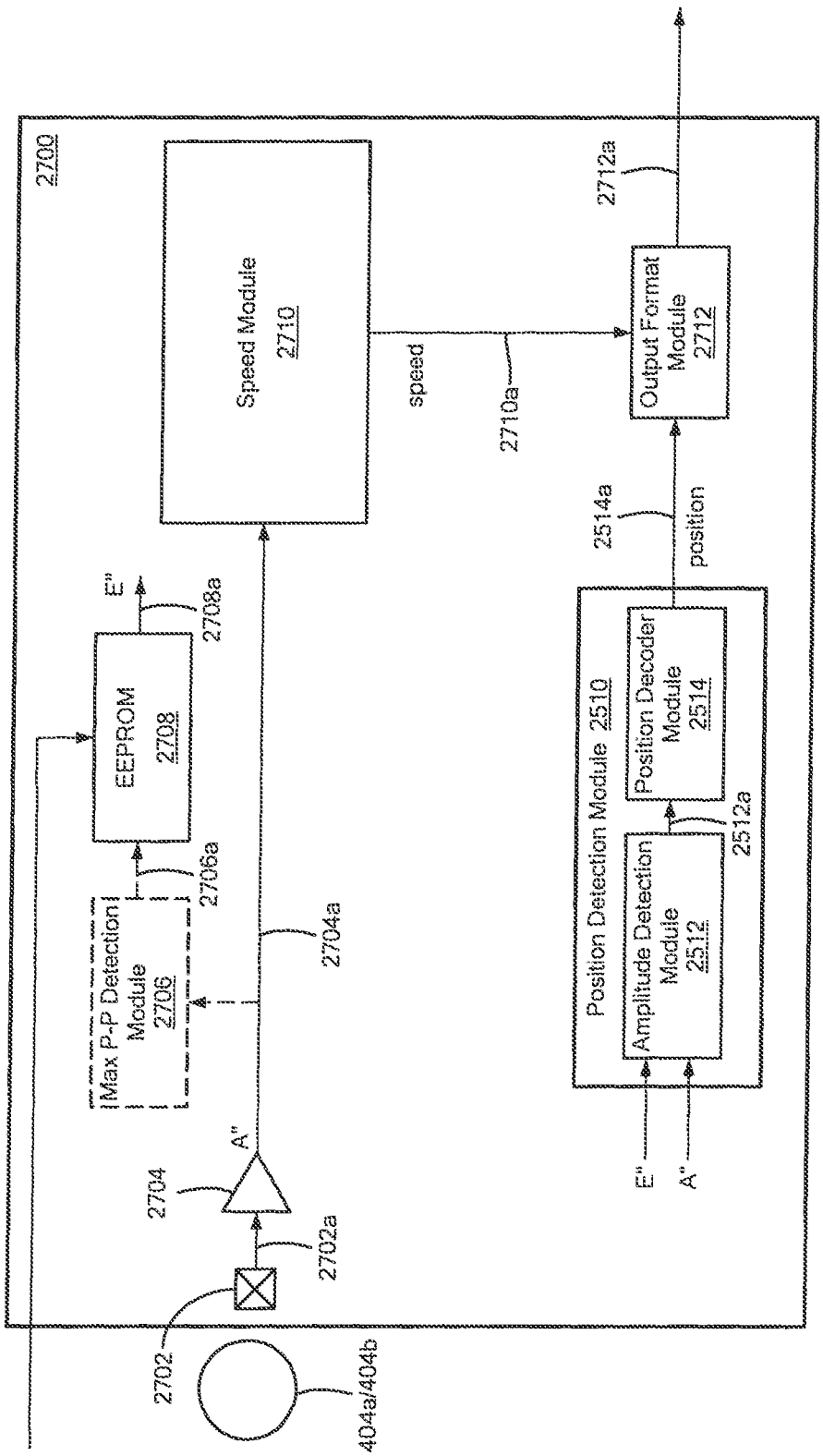
FIG. 27 is a block diagram showing another illustrative magnetic field sensor proximate to two target object portions, here shown to be conjoined, that can be like the magnetic field sensor and two portions of FIGS. 22 and 23, which can generate one of the signals of FIG. 24, and which can have an amplitude detection module operable to identify an amplitude of one of the signals of FIG. 24.

Referring now to FIG. 27, in which like elements of FIGS. 4 and 25 are shown having like reference designations, a magnetic field sensor 2700 can generate and use only the signal A" and the stored maximum peak-to-peak value E'". This arrangement should be apparent from the discussion above in conjunction with FIG. 26.

An output format module 2712 can be coupled to a speed signal 2171*a* generated by a speed module 2717. This arrangement is similar to that described above in conjunction with FIG. 8.

Figure 28:
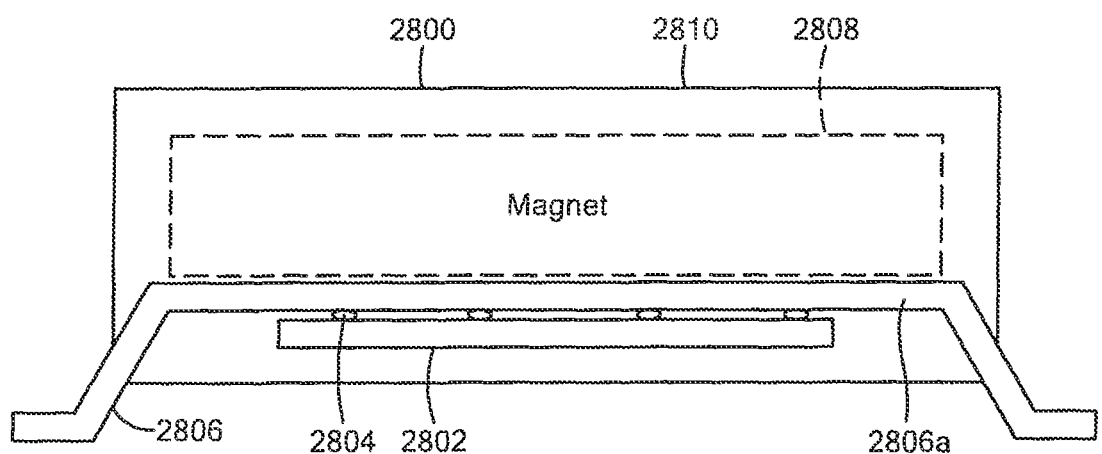
FIG. 28 is a block diagram of a side view of an illustrative magnetic field sensor that can be like the magnetic field sensor of FIGS. 22 and 23.

Referring now to FIG. 28, a magnetic field sensor 2800 can be like the magnetic field sensor 2500, 2700. The magnetic field sensor 2800 can include a single semiconductor substrate 2808 coupled with solder balls 2804 or the like to a mounting plate 2806*a* of a lead frame 2806.

In back-biased arrangement in which the target object 2200 is a ferromagnetic object, e.g. a gear, the magnetic field sensor 2800 can include a permanent magnet 2808. In other back-biased arrangements, the magnet 2808 can be external to the magnetic field sensor 2800. For non back-biased arrangements in which the target object is a ring or circular magnet, the permanent magnet 2808 can be omitted.

A solid molded enclosure 2810 can surround parts of the magnetic field sensor 2800 as shown.

Figure 29:
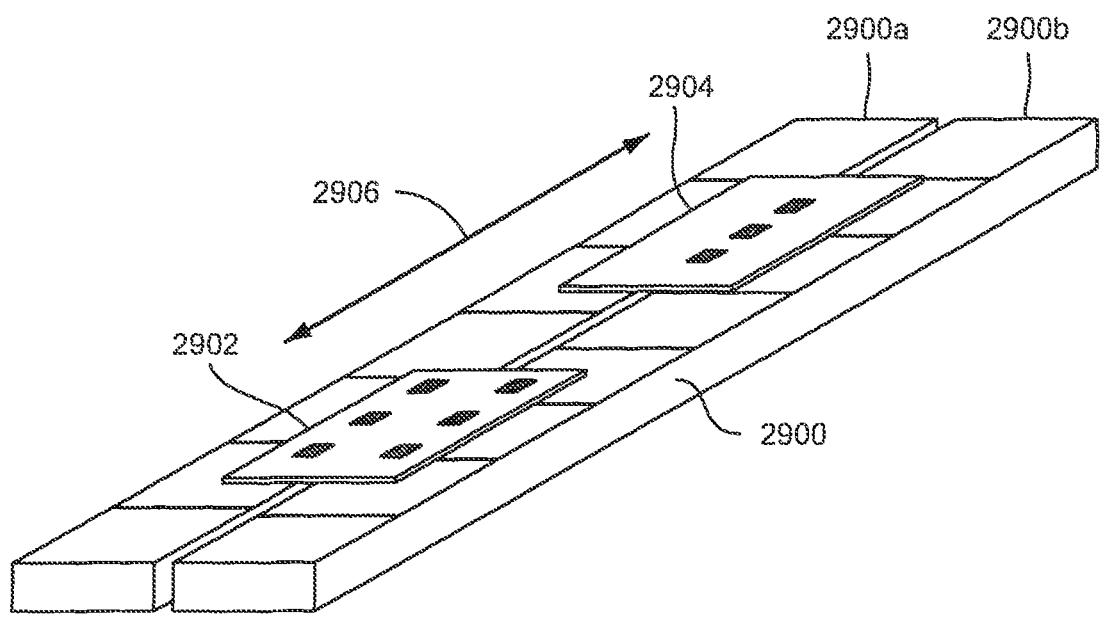
FIG. 29 is an isometric drawing of a flat target object having two different portions, each with a different quantity of target features, and first and second substrates of magnetic field sensors according to FIGS. 1 and 2 and FIGS. 22 and 23, respectively.

Referring now to FIG. 29, a flat target object 2900 can include first and second portions 2900*a*, 2900*b*, each having a different quantity of target features (e.g., teeth and valleys or magnetic poles).

A magnetic field sensor 2902 (here showing only a substrate) can be like the magnetic field sensor 102 of FIGS. 1 and 2, wherein a first one or more magnetic field sensing elements is disposed proximate to the first portion 2900*a* and a second one or more magnetic field sensing elements are disposed proximate to the second portion 2900*b*.

Also shown, a different magnetic field sensor 2904 (here showing only a substrate) can be like the magnetic field sensor 2204 of FIGS. 22 and 23, wherein one or more magnetic field sensing elements is disposed proximate to a boundary between the first and second portions 2900*a*, 2900*b*.

Movement of the target object 2900 can be parallel to a line 2906.

For back-biased arrangements, the target features of the target object 2900 can be teeth and valley of a gear. For non back-biased arrangements, the target features of the target object 2900 can be north and south poles of a multi-pole magnet.

Circuits and techniques described in conjunction with figures above apply equally well to the flat target object 2900 as they do to the round target objects described above.

All references cited herein are hereby incorporated herein by reference in their entirety.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

What is claimed is:

1. A magnetic field sensor for sensing an absolute position of a target object, wherein the target object has a first portion having a first quantity of target features and a second portion having a second quantity of target features different than the first quantity, wherein the first and second portions are proximate and mechanically fixed together, wherein the target object, including the first and second portions, is capable of a movement, wherein the magnetic field sensor comprises:
   one or more magnetic field sensing elements disposed proximate to a mechanical intersection of the first and second portions of the target object, wherein the one or more magnetic field sensing elements are operable to generate a first magnetic field signal responsive to the movement of both the first and second portions;
   a maximum peak-to-peak detection module coupled to the first magnetic field signal and operable to generate a maximum peak-to-peak value indicative of a maximum peak-to-peak value of the first magnetic field signal,
   a position detection module operable to use the first magnetic field signal to generate a position value indicative of the absolute position, wherein the position detection module comprises:
      an amplitude detection module coupled to the first magnetic field signal, coupled to the maximum peak-to-peak value, operable to measure an amplitude of the first magnetic field signal, operable to compare the amplitude of the first magnetic field signal with the maximum peak-to-peak value, and operable to generate an amplitude signal indicative of the absolute position in accordance with the comparison, wherein the magnetic field sensor further comprises:
   an output format module coupled to receive the position value and to generate an output signal from the magnetic field sensor indicative of the absolute position.

2. The magnetic field sensor of claim 1, wherein the absolute position of the target object comprises an absolute angle of a rotation of the target object.

3. The magnetic field sensor of claim 1, wherein the position detection module further comprises:
   a position decoder module coupled to the amplitude signal and operable to decode the amplitude signal to generate a position signal indicative of the absolute position.

4. The magnetic field sensor of claim 1, wherein the one or more magnetic field sensing elements are operable to generate a second magnetic field signal responsive to the movement of both the first and second portions, the magnetic field sensor further comprising:
   a speed and direction module coupled to receive the first and second magnetic field signals and operable to generate a speed signal indicative of a speed of the movement and operable to generate a direction signal indicative of a direction of the movement.

5. The magnetic field sensor of claim 1, wherein the amplitude detection module is further operable to generate an amplitude value indicate of the amplitude of the first magnetic field signal, wherein the position detection module comprises:
   a position decoder module coupled to receive the amplitude value, operable to relate the amplitude value to the absolute position, and operable to generate the position value in accordance with the amplitude value.

6. The magnetic field sensor of claim 1, further comprising:
   a semiconductor substrate, wherein the one or more magnetic field sensing elements, the position detection module, and the output format module are disposed upon the semiconductor substrate.

7. The magnetic field sensor of claim 1, wherein the one or more magnetic field sensing elements comprises three magnetic field sensing elements coupled in at least one differential arrangement in a respective at least one electronic channel.

8. The magnetic field sensor of claim 1, wherein the one or more magnetic field sensing elements consist of two magnetic field sensing elements coupled in a respective two electronic channels.

9. The magnetic field sensor of claim 1, wherein the one or more magnetic field sensing elements consist of three magnetic field sensing elements coupled in a differential arrangement in one electronic channel.

10. The magnetic field sensor of claim 1, wherein the one or more magnetic field sensing elements consist of a one magnetic field sensing element coupled in an electronic channel.

11. A method of sensing an absolute position of a target object with a magnetic field sensor, wherein the target object has a first portion having a first quantity of target features and a second portion having a second quantity of target features different than the first quantity, wherein the first and second portions are proximate and mechanically fixed together, wherein the target object, including the first and second portions, is capable of a movement, wherein the method comprises:
   generating, with one or more magnetic field sensing elements, a first magnetic field signal responsive to the movement of both the first and second portions;
   generating a maximum peak-to-peak value indicative of a maximum peak-to-peak value of the first magnetic field signal
   using the first magnetic field signal to generate a position value indicative of the absolute position, wherein the using the first magnetic field signal comprises:
      measuring an amplitude of the first magnetic field signal;
      comparing the amplitude of the first magnetic field signal with the maximum peak-to-peak value; and
      generating an amplitude signal indicative of the absolute position in accordance with the comparing, wherein the method further comprises:
   generating an output signal from the magnetic field sensor indicative of the absolute position.

12. The method of claim 11, wherein the absolute position of the target object comprises an absolute angle of a rotation of the target object.

13. The method of claim 11, wherein the using the first magnetic field signal further comprises:
decoding the amplitude signal to generate a position signal indicative of the absolute position.

14. The method of claim 11, further comprising:
generating a second magnetic field signal responsive to the movement of both the first and second portions;
generating a speed signal indicative of a speed of the movement; and
generating a direction signal indicative of a direction of the movement.

15. The method of claim 11, wherein the using the first magnetic field signal to generate the position value further comprises:
generating an amplitude value indicate of the amplitude of the first magnetic field signal;
relating the amplitude value to the absolute position; and
generating the position value in accordance with the amplitude value.

16. The method of claim 11, wherein the one or more magnetic field sensing elements comprises three magnetic field sensing elements coupled in at least one differential arrangement in a respective at least one electronic channel.

17. The method of claim 11, wherein the one or more magnetic field sensing elements consist of two magnetic field sensing elements coupled in a respective two electronic channels.

18. The method of claim 11, wherein the one or more magnetic field sensing elements consist of three magnetic field sensing elements coupled in a differential arrangement in one electronic channel.

19. The method of claim 11, wherein the one or more magnetic field sensing elements consist of a one magnetic field sensing element coupled in an electronic channel.

20. A magnetic field sensor for sensing an absolute position of a target object, wherein the target object has a first portion having a first quantity of target features and a second portion having a second quantity of target features different than the first quantity, wherein the first and second portions are proximate and mechanically fixed together, wherein the target object, including the first and second portions, is capable of a movement, wherein the magnetic field sensor comprises:
means for generating, with one or more magnetic field sensing elements, a first magnetic field signal responsive to the movement of both the first and second portions;
means for generating a maximum peak-to-peak value indicative of a maximum peak-to-peak value of the first magnetic field signal;
means for using the first magnetic field signal to generate a position value indicative of the absolute position, wherein the means for using the first magnetic field signal comprises:
means for measuring an amplitude of the first magnetic field signal;
means for comparing the amplitude of the first magnetic field signal with the maximum peak-to-peak value; and
means for generating an amplitude signal indicative of the absolute position in accordance with the means for comparing, wherein the magnetic field sensor further comprises:
means for generating an output signal from the magnetic field sensor indicative of the absolute position.

21. The magnetic field sensor of claim 20, wherein the absolute position of the target object comprises an absolute angle of a rotation of the target object.

22. The magnetic field sensor of claim 20, wherein the means for using the first magnetic field signal further comprises:
means for decoding the amplitude signal to generate a position signal indicative of the absolute position.

23. The magnetic field sensor of claim 20, further comprising:
means for generating a second magnetic field signal responsive to the movement of both the first and second portions;
means for generating a speed signal indicative of a speed of the movement; and
means for generating a direction signal indicative of a direction of the movement.

24. The magnetic field sensor of claim 20, wherein the means for using the first magnetic field signal to generate the position value further comprises:
means for generating an amplitude value indicate of the amplitude of the first magnetic field signal;
means for relating the amplitude value to the absolute position; and
means for generating the position value in accordance with the amplitude value.

25. The magnetic field sensor of claim 20, wherein the one or more magnetic field sensing elements comprises three magnetic field sensing elements coupled in at least one differential arrangement in a respective at least one electronic channel.

26. The magnetic field sensor of claim 20, wherein the one or more magnetic field sensing elements consist of two magnetic field sensing elements coupled in a respective two electronic channels.

27. The magnetic field sensor of claim 20, wherein the one or more magnetic field sensing elements consist of three magnetic field sensing elements coupled in a differential arrangement in one electronic channel.

28. The magnetic field sensor of claim 20, wherein the one or more magnetic field sensing elements consist of a one magnetic field sensing element coupled in an electronic channel.

29. The magnetic field sensor of claim 20, further comprising:
means for generating a gain responsive to the maximum peak-to-peak value.

* * * * *

UNITED STATES PATENT AND TRADEMARK OFFICE
CERTIFICATE OF CORRECTION

PATENT NO. : 10,816,366 B2
APPLICATION NO. : 16/254869
DATED : October 27, 2020
INVENTOR(S) : Dominik Weiland et al.

It is certified that error appears in the above-identified patent and that said Letters Patent is hereby corrected as shown below:

In the Specification

Column 2, Line 15 delete "plurality signals" and replace with --plurality of signals--.

Column 4, Line 29 delete "identity" and replace with --identify--.

Column 4, Line 58 delete "identity" and replace with --identify--.

Column 4, Line 62 delete "if FIGS." and replace with --of FIGS.--.

Column 5, Line 54 delete "element (AMR)" and replace with --(AMR) element--.

Column 8, Line 22 delete "so FIG. 1" and replace with --of FIG. 1--.

Column 8, Line 40 delete "S4, S4" and replace with --S4, S5--.

Column 9, Line 15 delete "shown" and replace with --are shown--.

Column 11, Line 54 delete "two signal" and replace with --two signals--.

Column 12, Line 25 delete "of as" and replace with --of a--.

Column 13, Line 49 delete "8018$a$" and replace with --818$a$--.

Column 13, Line 50 delete "designation C" and replace with --designation C.--.

Column 13, Line 52 delete "a and can" and replace with --and can--.

Column 13, Line 53 delete "812$a$" and replace with --824$a$--.

Signed and Sealed this
Sixteenth Day of November, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,816,366 B2

Column 13, Line 66 delete "to selected" and replace with --to select--.

Column 14, Line 5 delete "a and" and replace with --and--.

Column 14, Line 15 delete "positions signal" and replace with --position signal--.

Column 14, Line 26 delete "4040$a$" and replace with --404$a$--.

Column 14, Line 43 delete "FIG. 4 of" and replace with --FIG. 4 or--.

Column 15, Line 15 delete "unit" and replace with --units--.

Column 16, Line 8 delete "signals" and replace with --signal--.

Column 16, Line 34 delete "mode" and replace with --module--.

Column 19, Line 26 delete "220$b$" and replace with --2202$b$--.

Column 19, Line 30 delete "2200$b$" and replace with --2202$b$--.

Column 19, Line 59 delete "25" and replace with --2500--.

Column 21, Line 27 delete "an/or" and replace with --and/or--.

Column 21, Line 64 delete "peak-to-peak" and replace with --peak-to-peak values--.

Column 22, Line 20 delete "above" and replace with --above, it--.

Column 22, Line 35 delete "2171$a$" and replace with --2717$a$--.

Column 22, Line 43 delete "arrangement" and replace with --arrangements--.

In the Claims

Column 24, Line 10 Claim 5 delete "indicate" and replace with --indicative--.

Column 25, Line 18 Claim 15 delete "indicate" and replace with --indicative--.

Column 26, Line 31 Claim 24 delete "indicate" and replace with --indicative--.